(12) United States Patent
Hosono et al.

(10) Patent No.: US 12,461,605 B2
(45) Date of Patent: Nov. 4, 2025

(54) INPUT DEVICE

(71) Applicant: Alps Alpine Co., Ltd., Tokyo (JP)

(72) Inventors: Kunio Hosono, Fukushima-ken (JP); Tetsuo Muranaka, Miyagi-ken (JP); Tetsu Numata, Miyagi-ken (JP); Sadayuki Yaginuma, Miyagi-ken (JP)

(73) Assignee: Alps Alpine Co., Ltd. (JP)

( * ) Notice: Subject to any disclaimer, the term of this patent is extended or adjusted under 35 U.S.C. 154(b) by 0 days.

(21) Appl. No.: 18/810,679

(22) Filed: Aug. 21, 2024

(65) Prior Publication Data

US 2025/0076995 A1    Mar. 6, 2025

(30) Foreign Application Priority Data

Aug. 31, 2023  (JP) ................. 2023-141805

(51) Int. Cl.
*G06F 3/0338* (2013.01)
*G06F 3/02* (2006.01)

(52) U.S. Cl.
CPC .......... *G06F 3/0338* (2013.01); *G06F 3/0202* (2013.01)

(58) Field of Classification Search
CPC .... G06F 3/0338; G06F 3/0202; G06F 3/0205; H01H 2300/024
USPC ........................................ 345/157
See application file for complete search history.

(56) References Cited

U.S. PATENT DOCUMENTS

2018/0373347 A1*  12/2018  Naito .................. H01H 25/065
2021/0173348 A1*   6/2021  Ferri ..................... G04C 3/002

FOREIGN PATENT DOCUMENTS

JP      4667732 B2 *  4/2011
JP      6069288 B2 *  2/2017

* cited by examiner

*Primary Examiner* — Mark Edwards
(74) *Attorney, Agent, or Firm* — Harness, Dickey & Pierce, P.L.C.

(57) ABSTRACT

An input device includes a strain generation body having an operation shaft, a load sensor configured to detect a load in a horizontal direction applied to the operation shaft, an operation member disposed in an upper portion of the operation shaft, the operation member being configured to be operated in a pressing operation, a switch section configured to detect the pressing operation performed by using the operation member, and a controller configured to output a detection value of the load in the horizontal direction detected by the load sensor and a detection value of the pressing operation detected by the switch section to an external device. The controller is configured not to update the output value of the detection value of the load in the horizontal direction while the pressing operation is being detected by the switch section.

14 Claims, 19 Drawing Sheets

INPUT DEVICE

CLAIM OF PRIORITY

This application claims benefit of Japanese Patent Application No. 2023-141805 filed on Aug. 31, 2023, which is hereby incorporated by reference.

BACKGROUND OF THE INVENTION

1. Field of the Invention

The present invention relates to an input device.

2. Description of the Related Art

Japanese Patent No. 4667732 discloses a stick-type coordinate input device capable of simultaneously performing a tilting operation and a pressing operation. The device is configured to activate a pressure sensor using a stick that is provided to an operation member to detect a pressing operation of the operation member, and detect a tilting operation of the operation member using a strain sensor provided on a board in a lower part of the operation member.

In the stick-type coordinate input device disclosed in Japanese Patent No. 4667732, however, when a pressing operation is performed, part of a load applied to the operation member by the pressing operation may also be added to the strain sensor, and the load may become unstable contrary to the operator's intention.

SUMMARY OF THE INVENTION

An input device according to an embodiment includes a strain generation body having an operation shaft, a load sensor configured to detect a load in a horizontal direction applied to the operation shaft, an operation member disposed in an upper portion of the operation shaft, the operation member being configured to be operated in a pressing operation, a switch section configured to detect the pressing operation performed by using the operation member, and a controller configured to output a detection value of the load in the horizontal direction detected by the load sensor and a detection value of the pressing operation detected by the switch section to an external device. The controller is configured not to update the output value of the detection value of the load in the horizontal direction while the pressing operation is being detected by the switch section.

According to an input device according to an embodiment, when a pressing operation is performed, output values of detection values in a horizontal operation can be prevented from becoming unstable contrary to the operator's intention.

DESCRIPTION OF THE PREFERRED EMBODIMENTS

Figure 1:
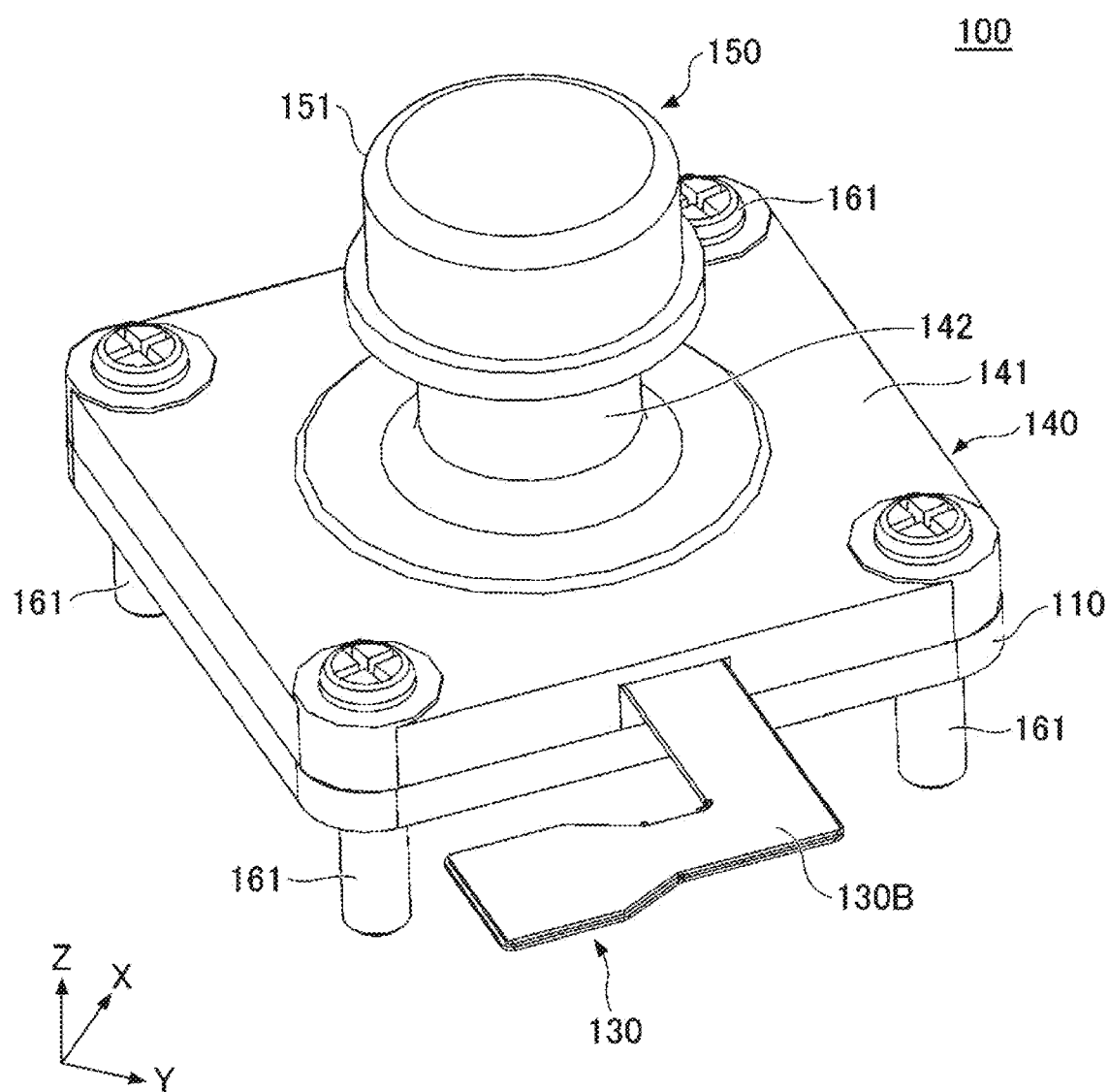
FIG. 1 is an external perspective view of an input device according to an embodiment.

Hereinafter, an embodiment will be described. In the following description, for convenience, the X-axis direction in the drawings denotes the front-rear direction, the Y-axis direction in the drawings denotes the left-right direction, and the Z-axis direction in the drawings denotes the up-down direction, in which, the X-axis positive direction denotes the forward direction, the Y-axis positive direction denotes the rightward direction, and the Z-axis positive direction denotes the upward direction. It should be noted that these directions denote relative positional relationships in a device and do not limit device installation directions or operation directions, and similar relative positional relationships in the device may have different installation directions or operation directions and those are all included within the scope of the invention.

EMBODIMENT

Structure of Input Device 100

Figure 2:
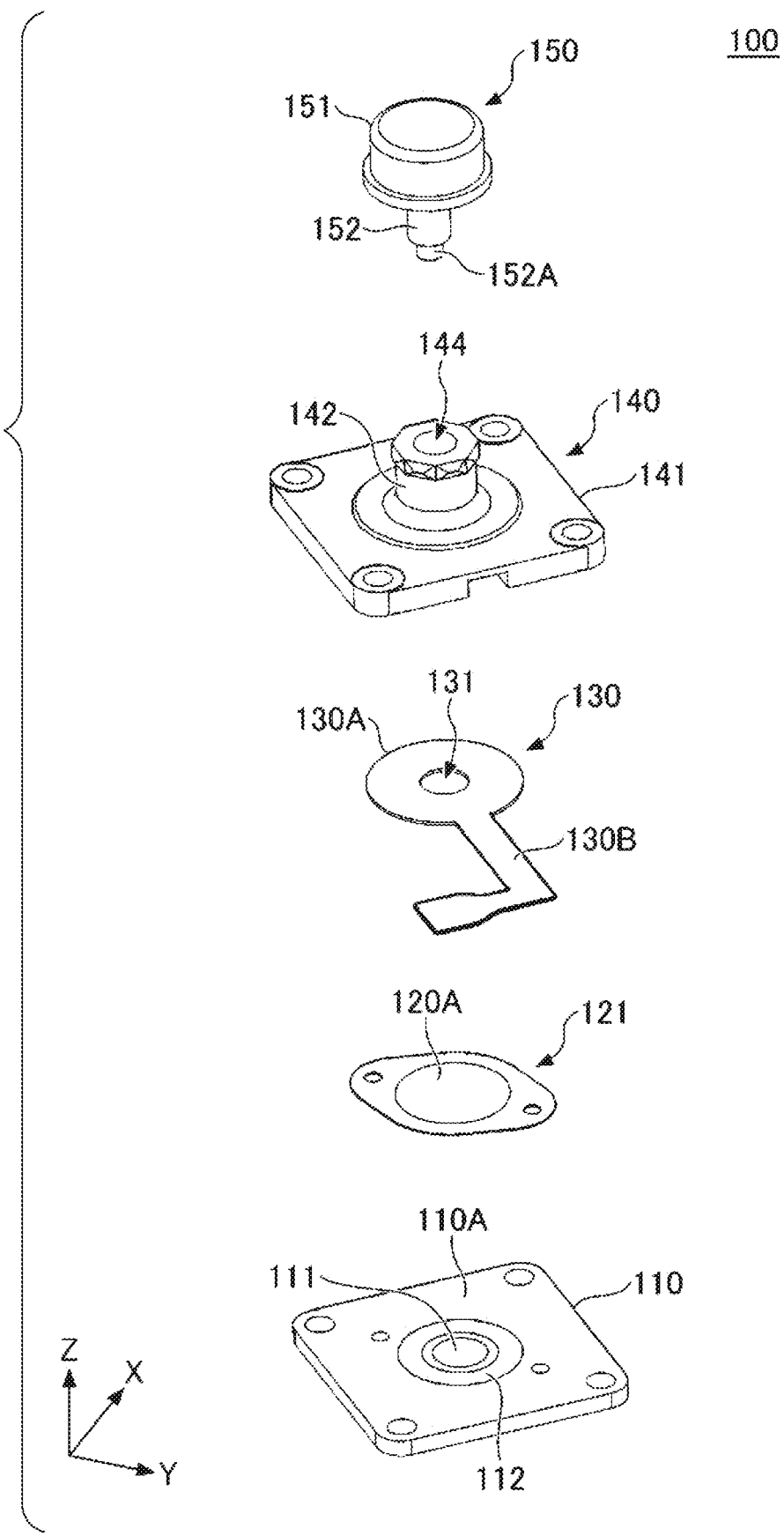
FIG. 2 is an exploded perspective view of an input device according to an embodiment viewed from above.
Figure 3:
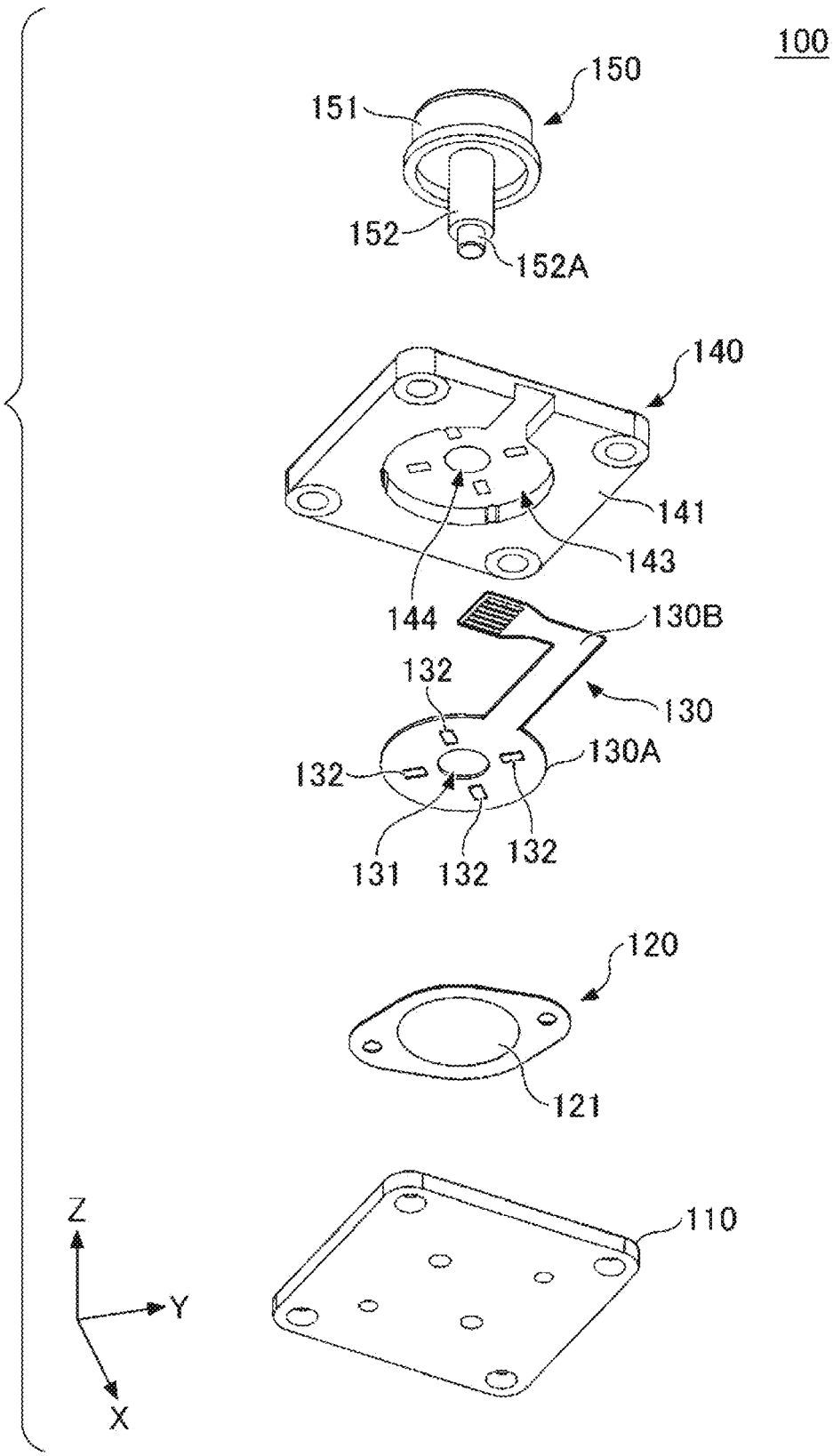
FIG. 3 is an exploded perspective view of an input device according an embodiment viewed from below.
Figure 4:
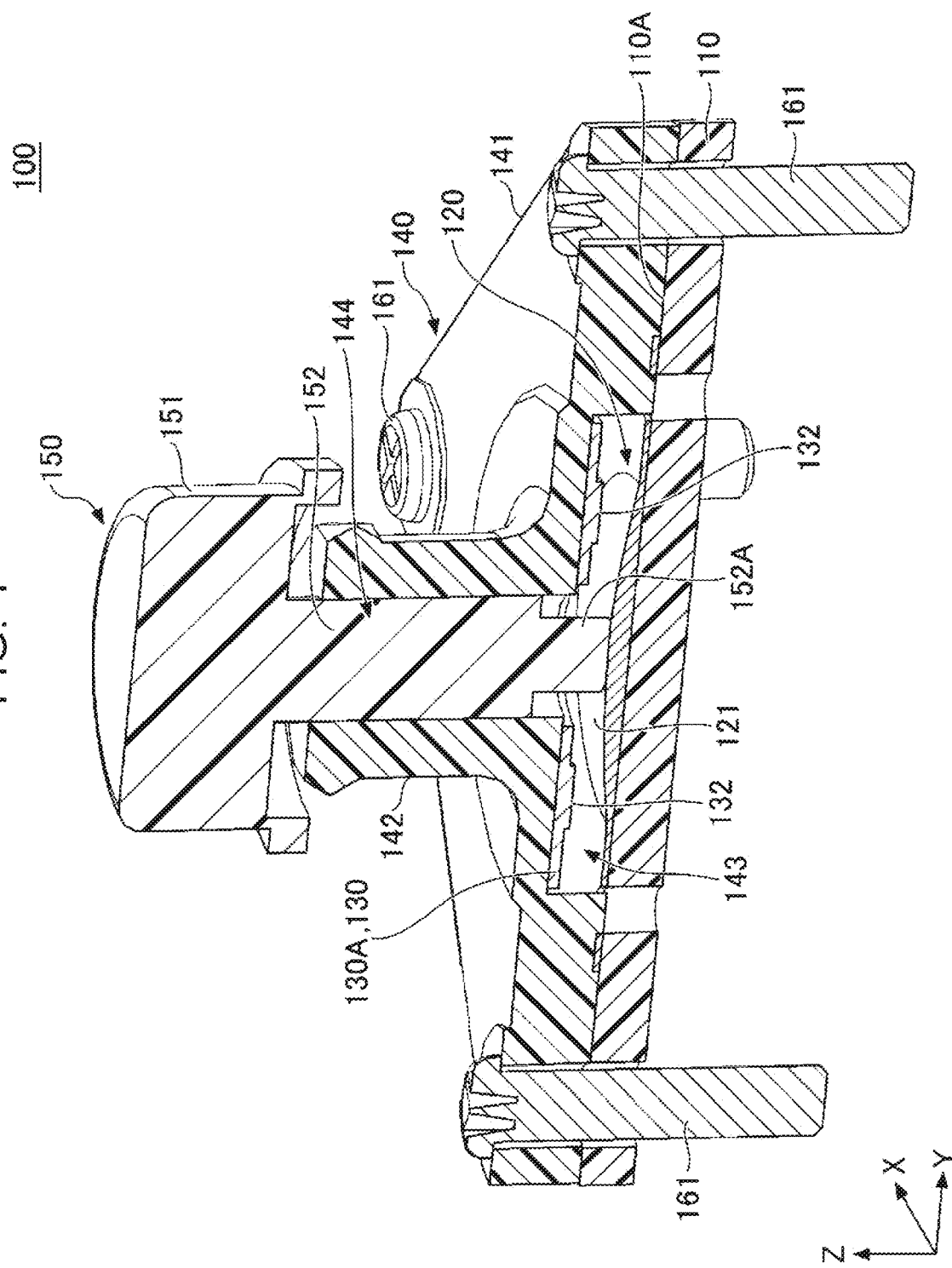
FIG. 4 is a perspective cross-sectional view of an input device according to an embodiment.

FIG. 1 is an external perspective view of an input device 100 according to an embodiment. FIG. 2 is an exploded perspective view of the input device 100 according to the embodiment viewed from above. FIG. 3 is an exploded perspective view of the input device 100 according the embodiment viewed from below. FIG. 4 is a perspective cross-sectional view of the input device 100 according to the embodiment.

The input device 100 illustrated in FIG. 1 to FIG. 3 can be used in, for example, game machine controllers, notebook personal computers, and other devices. The input device 100 is an input device that allows horizontal operations in the horizontal directions (the X-axis direction and the Y-axis direction) and pressing operations in the downward direction (the Z-axis negative direction). As illustrated in FIG. 1 to FIG. 3, the input device 100 includes a board 110, a movable contact 120, a flexible substrate 130, a strain generation body 140, and an operation member 150.

The board 110 is disposed on the lowermost side (Z-axis negative side) of the input device 100 and is a plate-like member that is made of resin and flat. In this embodiment, for example, the board 110 has a square shape in plan view when viewed from above (Z-axis positive direction).

The board 110 has a circular first stationary contact 111 and an annular second stationary contact 112 that surrounds the first stationary contact 111 in a central portion of an upper surface 110A of the board 110. The first stationary contact 111 and the second stationary contact 112 are both thin metal plates.

The board 110 is screwed on an installation surface with four screws 161 that pass through the board 110 and a base 141 of the strain generation body 140 in the up-down direction (Z-axis direction) in a state in which the board 110 is stacked with the base 141 of the strain generation body 140.

The movable contact 120 is a thin metal plate and is stacked over the first stationary contact 111 and on the second stationary contact 112 of the board 110. The movable contact 120 has a domed dome portion 121 that protrudes upward (Z-axis positive direction) in a central part of the movable contact 120.

The movable contact 120 functions as a "switch section" together with the first stationary contact 111 and the second stationary contact 112. The movable contact 120 is always in contact with the second stationary contact 112 in an outer edge portion of the dome portion 121. The central part of the dome portion 121 in the movable contact 120 is away from the first stationary contact 111 when no pressing operation is made to the operation member 150. When a pressing operation is performed using the operation member 150, the dome portion 121 of the movable contact 120 is pressed by a pressing portion 152A of the operation member 150 to be reversed, and thereby, the central part of the dome portion 121 comes into contact with the first stationary contact 111. This operation enables the movable contact 120 to make the first stationary contact 111 and the second stationary contact 112 to be electrically connected with each other via the movable contact 120. The movable contact 120 provides tactile response when the dome portion 121 is reversed.

The flexible substrate 130 is a flexible film-like wiring member and is disposed in a recessed portion 143 in a lower surface of the base 141 of the strain generation body 140 in a state in which the flexible substrate 130 is fixed to a ceiling surface of the recessed portion 143. The flexible substrate 130 is bonded to the ceiling surface of the recessed portion 143 with a bonding means, such as an adhesive, in the recessed portion 143 of the strain generation body 140. The flexible substrate 130 has a base 130A and an extension portion 130B.

The base 130A is an annular portion and is disposed in a central portion in the lower surface of the base 141 of the strain generation body 140. The base 130A has a circular central opening 131 in a central portion. Through the central opening 131, a shaft portion 152 of the operation member 150 is inserted.

The extension portion 130B is an L-shaped strip portion that extends outward from a peripheral edge portion of the base 130A. The extension portion 130B is configured, at its tip portion, to be electrically connected to an external component.

In the flexible substrate 130, four strain sensors 132 are disposed on the same circumference and at regular intervals (i.e. 90-degree intervals) around the central opening 131 in a lower surface of the base 130A. Each of the four strain sensors 132 is a resistive element printed on the lower surface of the base 130A. The four strain sensors 132 are an example "load sensor" and are configured to detect a load in a horizontal direction applied to an operation shaft 142 of the strain generation body 140.

More specifically, the strain sensors 132 are disposed on the lower surface of the base 130A of the flexible substrate 130 in the four directions with respect to the central opening 131 respectively, that is, the rightward direction (the Y-axis positive direction), the leftward direction (the Y-axis negative direction), the forward direction (the X-axis positive direction), and the rearward direction (the X-axis negative direction). In other words, the four strain sensors 132 are disposed in a cross arrangement around the central opening 131.

The detection directions of the respective four strain sensors 132 are in radial directions with respect to the operation shaft 142. Accordingly, when a horizontal operation is performed on the operation member 150 and the base 141 (around the base of the operation shaft 142) is deformed via the operation shaft 142, the four strain sensors 132 each deform (extend or contract) in response to the deformation of the base 141, and thereby, the resistance values change. With this structure, the four strain sensors 132 each can detect strain in the base 141 caused by the horizontal operation performed on the operation shaft 142, and thus, the load in the horizontal direction applied to the operation shaft 142 by the horizontal operation of the operation member 150 can be detected.

The flexible substrate 130 can output a load detection signal (analog signal) representing a load in a horizontal direction applied to the operation shaft 142 detected by each of the four strain sensors 132 via the extension portion 130B to the outside (control device 170).

More specifically, the two strain sensors 132 disposed on the front side (X-axis positive direction) and the rear side (X-axis negative direction) with respect to the central opening 131 are electrically connected in series with each other. In response to a load in an X-axis direction applied to the operation shaft 142, one strain sensor 132 extends and the other strain sensor 132 contracts and the voltage value at a midpoint between the two strain sensors 132 changes. Based on the voltage value (load detection signal) at the midpoint, the external (output destination of the load detection signal) device (control device 170) can detect the load in the X-axis direction applied to the operation shaft 142.

Similarly, the two strain sensors 132 disposed on the right side (Y-axis positive direction) and the left side (Y-axis negative direction) with respect to the central opening 131 are electrically connected in series with each other. In response to a load in the Y-axis direction applied to the operation shaft 142, one strain sensor 132 extends and the other strain sensor 132 contracts and the voltage value at a midpoint between the two strain sensors 132 changes. Based on the voltage value (load detection signal) at the midpoint, the external (output destination of the load detection signal) device (control device 170) can detect the load in the Y-axis direction applied to the operation shaft 142.

The strain generation body 140 is a resin member that deforms in response to an application of an operation load via the operation member 150 when a horizontal operation is performed on the operation member 150. The strain generation body 140 includes the base 141 and the operation shaft 142.

The base 141 is a flat plate-like member having a constant thickness in the up-down direction (Z-axis direction). The base 141 has a shape similar to that of the board 110, that is, a square shape in plan view when viewed from above (Z-axis positive direction).

The recessed portion 143 that is recessed upward is formed in the lower surface of the base 141. The recessed portion 143 has a shape similar to that of the flexible substrate 130 (the base 130A and a part of the extension portion 130B) in plan view when viewed from below (Z-axis negative direction). With this structure, the strain generation body 140 can accommodate the flexible substrate 130 (the base 130A and a part of the extension portion 130B) inside the recessed portion 143.

The operation shaft 142 is a columnar portion of the base 141 vertically provided upward (Z-axis positive direction) from a central portion of the upper surface of the base 141. The operation shaft 142 transmits a load to the base 141 when a horizontal operation is performed (i.e. when a load is applied in a horizontal direction) on the operation member 150. The load transmitted via the operation shaft 142 causes a strain in the portion around the operation shaft 142 in the base 141.

A circular through hole 144 that passes through the base 141 and the operation shaft 142 in the up-down direction (Z-axis direction) is formed in a central part of the strain generation body 140. Into the through hole 144, the shaft portion 152 of the operation member 150 is inserted. With this structure, the strain generation body 140 can support the operation member 150 movably in the up-down direction (Z-axis direction).

The operation member 150 is a resin member disposed above the operation shaft 142 of the strain generation body 140. The operation member 150 has an operation portion 151 and the shaft portion 152.

The operation portion 151 is a columnar portion having a diameter larger than that of the operation shaft 142 of the strain generation body 140 and is provided at an upper end of the operation member 150. The operation portion 151 is disposed above the operation shaft 142. The operator touches the operation portion 151 to perform a horizontal operation and a pressing operation.

The shaft portion 152 is a columnar portion having a diameter smaller than that of the operation shaft 142 of the strain generation body 140 and is vertically provided downward (Z-axis negative direction) from a central part of the lower surface of the operation portion 151. The shaft portion 152 of the operation member 150 is inserted into the through hole 144 of the strain generation body 140. With this structure, the operation member 150 can be supported by the strain generation body 140 so as to be movable in the up-down direction (Z-axis direction). The operation member 150 is moved downward in response to a pressing operation (i.e. an operation for applying a downward load) performed by the operator. In response to a horizontal operation (i.e. an operation for applying a load in a horizontal direction) performed by the operator on the operation member 150, the shaft portion 152 applies a load from the inside to the operation shaft 142 of the strain generation body 140.

A columnar pressing portion 152A is provided in a lower end portion of the shaft portion 152. The pressing portion 152A is provided above (Z-axis positive side) the central portion of the movable contact 120 to face the central portion of the movable contact 120. In response to a pressing operation by using the operation member 150, the pressing portion 152A presses the central portion of the movable contact 120 to elastically deform the central portion of the movable contact 120, thereby bringing the central portion of the movable contact 120 to come into contact with the first stationary contact 111.

As described above, in the input device 100 according to the embodiment, the operation member 150 includes the shaft portion 152 passing through the strain generation body 140, the strain sensors 132 are disposed on the flexible substrate 130 fixed to the lower surface of the strain generation body 140. When a horizontal operation is performed by using the operation member 150 to apply a load to the operation shaft 142, the strain sensors 132 detect the deformation of the strain generation body 140, thereby detecting the load in the horizontal direction applied to the operation shaft 142. The switch section is disposed under the strain generation body 140. When a pressing operation is performed by using the operation member 150, the switch section is pressed by the shaft portion 152 of the operation member 150, thereby detecting the pressing operation by the operation member 150.

With this structure, when a horizontal operation is performed by using the operation member 150, the input device 100 according to the embodiment can reliably cause a strain in the strain generation body 140 by using the shaft portion 152 without pressing the switch section, and when a pressing operation is performed by using the operation member 150, the input device 100 can reliably press the switch section by using the shaft portion 152 without causing a strain in the strain generation body 140.

In the input device 100 according to the embodiment, the switch section includes the movable contact 120 having the elastically deformable domed dome portion 121, and the first stationary contact 111 disposed under the movable contact 120. When the dome portion 121 is pressed by using the operation member 150, the dome portion 121 is reversed to come into contact with the first stationary contact 111, and thereby the pressing operation by using the operation member 150 is detected.

Accordingly, the input device 100 according to the embodiment can reliably detect the pressing operation performed using the operation member 150 with the relatively simple structure including the movable contact 120 and the first stationary contact 111.

In the input device 100 according to the embodiment, the movable contact 120 is a metal plate having the dome portion 121, and provides tactile response when the dome portion 121 is reversed.

With this structure, the input device 100 according to the embodiment can provide tactile response to the operator who performed the pressing operation by using the operation member 150, enabling the operator to readily understand in a tactile manner that the pressing operation has been reliably performed.

Configuration of Control System in Input Device 100

Figure 5:
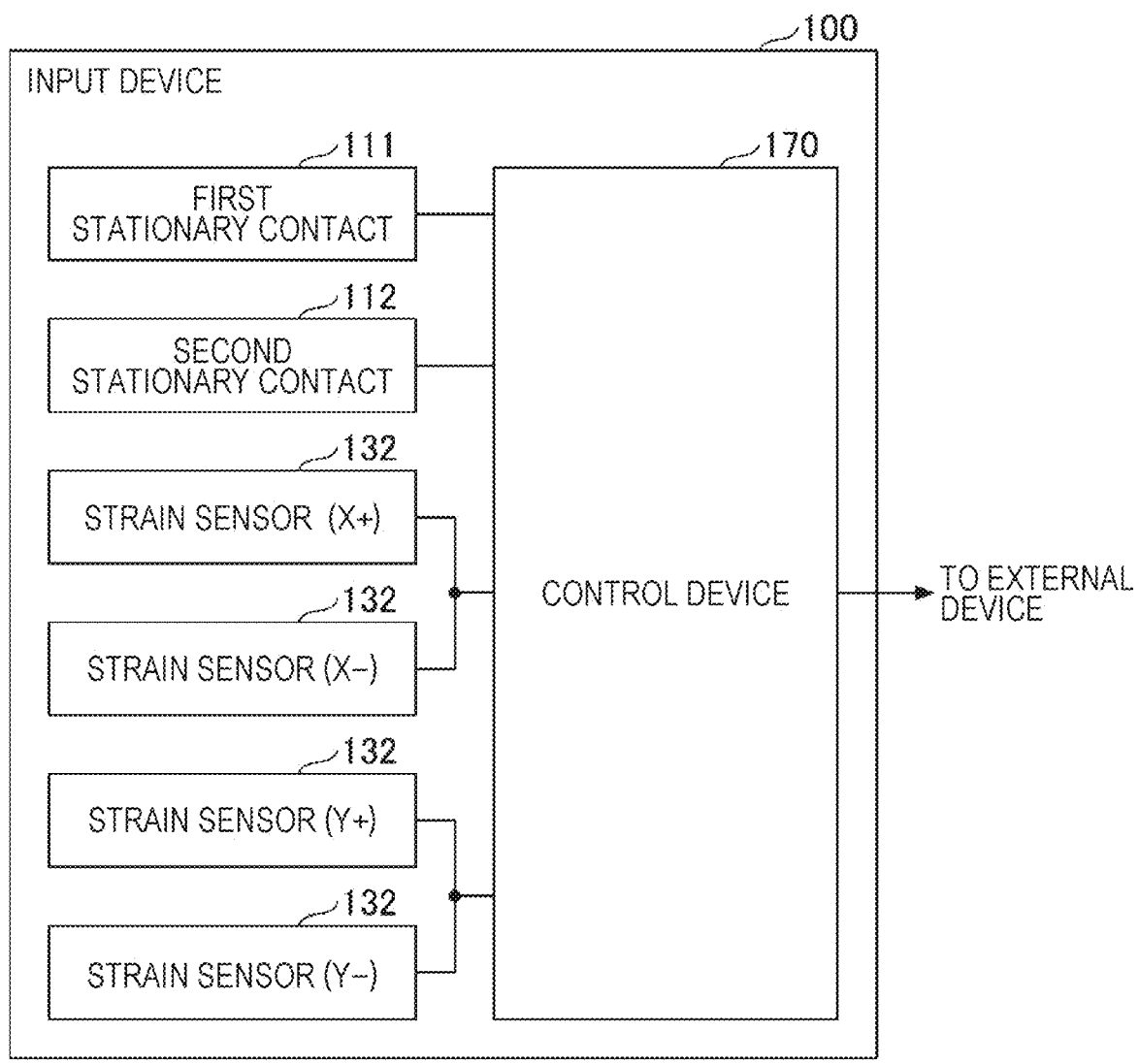
FIG. 5 is a block diagram illustrating a configuration of a control system in an input device according to an embodiment.

FIG. 5 is a block diagram illustrating a configuration of a control system in the input device 100 according to the embodiment.

As illustrated in FIG. 5, the control system in the input device 100 includes the first stationary contact 111, the second stationary contact 112, the four strain sensors 132, and the control device 170.

The control device 170 is an example "controller". The control device 170 is electrically connected to the first stationary contact 111 and the second stationary contact 112. This configuration enables the control device 170 to detect whether the first stationary contact 111 and the second stationary contact 112 are electrically connected with each other. When the control device 170 detects that the first stationary contact 111 and the second stationary contact 112 are electrically connected with each other via the movable contact 120, the control device 170 can detect that the switch section is on, that is, can detect a pressing operation performed by using the operation member 150.

The control device 170 is electrically connected to each of the four strain sensors 132. More specifically, the control device 170 is connected to a bridge circuit that includes the four strain sensors 132.

The control device 170 can detect, based on a voltage value at the midpoint between the two strain sensors 132 (the strain sensor (X+) and the strain sensor (X−)) provided in the X-axis direction, a load in the X-axis direction applied to the operation shaft 142 due to a horizontal operation on the operation member 150.

The control device 170 can detect, based on a voltage value at a midpoint between the two strain sensors 132 (the strain sensor (Y+) and the strain sensor (Y−)) provided in the Y-axis direction, a load in the X-axis direction applied to the operation shaft 142 due to a horizontal operation on the operation member 150.

The control device 170 includes a processor (for example, a central processing unit (CPU)), memory (for example, read only memory (ROM), and random access memory (RAN)), and other components. The control device 170 implements a program stored in the memory using the processor to implement each function of the control device 170. For example, for the control device 170, an integrated circuit (IC) may be used.

First Example of Output Control Processing by Control Device 170

Figure 6:
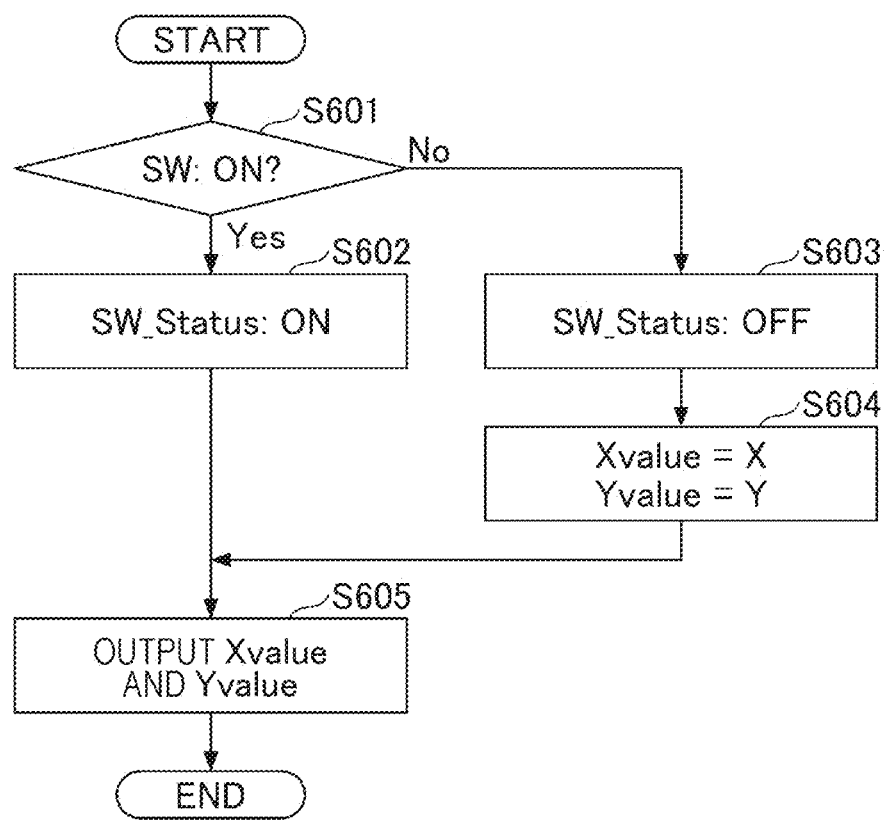
FIG. 6 is a flowchart illustrating a first example of output control processing to be performed by a control device in an input device according to an embodiment.

FIG. 6 is a flowchart illustrating a first example of output control processing to be performed by the control device 170 in the input device 100 according to the embodiment.

The definitions of values used in the output control processing in FIG. 6 are described as follows:

Variable SW_Status: Value that indicates a status of the switch section;
Detection Value X: a detection value of a load in the X-axis direction applied to the operation shaft 142 detected by the strain sensors 132;
Detection Value Y: a detection value of a load in the Y-axis direction applied to the operation shaft 142 detected by the strain sensors 132;
Output Value Xvalue: an output value of a load in the X-axis direction applied to the operation shaft 142;
Output Value Yvalue: an output value of a load in the Y-axis direction applied to the operation shaft 142.

First, the control device 170 determines whether the switch section (SW) is in an on state (step S601). Here, when the control device 170 detects that the first stationary contact 111 and the second stationary contact 112 are electrically connected with each other, the control device 170 determines that the switch section (SW) is in an on state. When the control device 170 detects that the first stationary contact 111 and the second stationary contact 112 are not electrically connected with each other, the control device 170 determines that the switch section (SW) is in an off state.

In step S601, when it is determined that the switch section (SW) is in an on state (step S601: Yes), the control device 170 sets "ON" to the variable SW_Status (step S602). Next, the control device 170 outputs an output value Xvalue and an output value Yvalue without updating the output value Xvalue and the output value Yvalue (step S605). More specifically, detection values when the switch section (SW) was last in an off state are output. The control device 170 then ends the sequence of processing in FIG. 6.

On the other hand, in step S601, when it is determined that the switch section (SW) is in an off state (step S601: No), the control device 170 sets "OFF" to the variable SW_Status (Step S603). Next, the control device 170 updates an output value Xvalue and an output value Yvalue to a detection value X and a detection value Y respectively (step S604), and outputs the output value Xvalue and the output value Yvalue (step S605). The control device 170 then ends the sequence of processing in FIG. 6.

When the input device 100 is activated, the control device 170 initializes the output value Xvalue and the output value Yvalue to "0". While the input device 100 is being activated, the control device 170 repeatedly performs the sequence of processing in FIG. 6.

Figure 7:
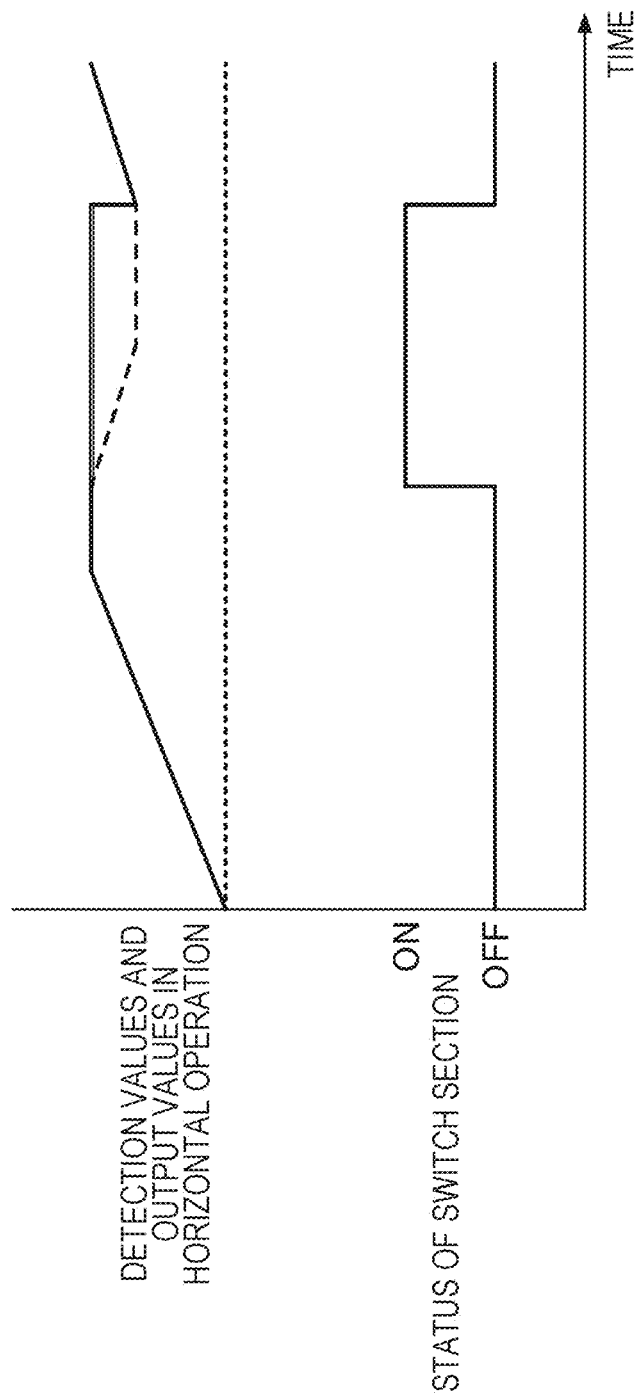
FIG. 7 is a timing diagram illustrating an example of time variations of detection values and output values in a horizontal operation in an input device according to an embodiment.

FIG. 7 is a timing diagram illustrating an example of time variations of detection values and output values in a horizontal operation in the input device 100 according to the embodiment.

In the upper section in FIG. 7, the dotted line denotes detection values (detection values in the horizontal direction applied to the operation shaft 142 detected by the strain sensors 132) in a horizontal operation. In the upper section in FIG. 7, the solid line denotes output values of detection values in the horizontal operation.

As illustrated in FIG. 7, in the input device 100, when a horizontal operation is performed by using the operation member 150, if a pressing operation is performed by using the operation member 150, the detection values in the horizontal operation may become unstable due to the influence of the pressing operation.

However, the input device 100 can keep the output value to be constant by performing the sequence of processing in FIG. 6 with the control device 170 so as not to update the output values of the detection values in the horizontal operation while the pressing operation is performed by using the operation member 150 as illustrated in FIG. 7.

As described above, in the input device 100 according to the embodiment, the control device 170 performs the sequence of processing in FIG. 6 so as not to update output values of detection values of a load in a horizontal direction while a pressing operation by using the operation member 150 is detected by the switch section.

By this operation, when a horizontal operation and a pressing operation by using the operation member 150 are simultaneously performed, the input device 100 according to the embodiment can keep the output values of the detection values of the horizontal operation to be constant even if the detection values (i.e. detection values of the load in the horizontal direction applied to the operation shaft 142) in the horizontal operation become unstable due to the influence of the pressing operation. Accordingly, the input device 100 according to the embodiment can prevent output values of detection values in a horizontal operation from becoming unstable contrary to the operator's intention.

Second Example of Output Control Processing by Control Device 170

Figure 8:
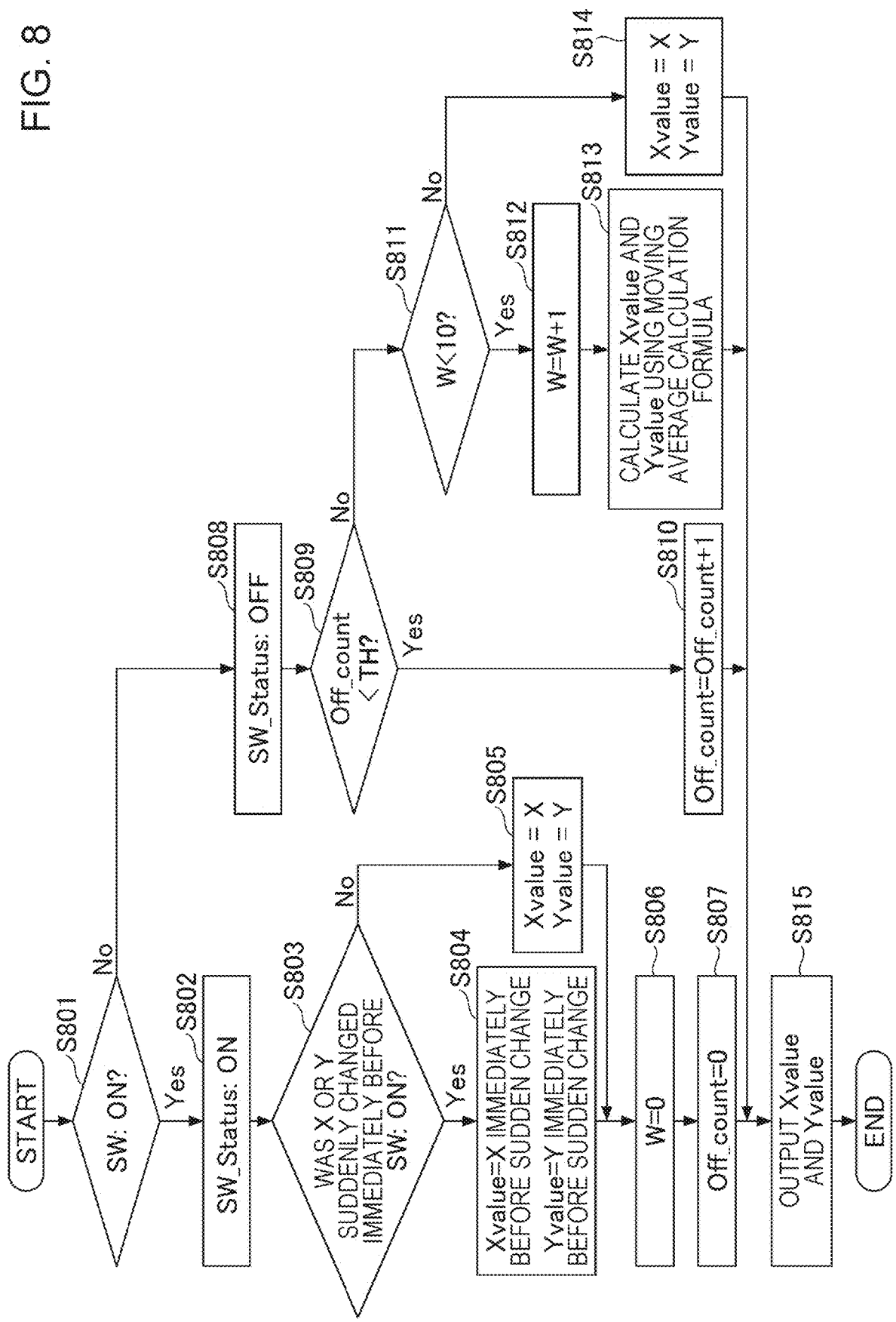
FIG. 8 is a flowchart illustrating a second example of output control processing to be performed by a control device in an input device according to an embodiment.

FIG. 8 is a flowchart illustrating a second example of output control processing to be performed by the control device 170 in the input device 100 according to the embodiment.

The definitions of values used in the output control processing in FIG. 8 are described as follows:

Variable SW_Status: a value that indicates a status of the switch section;

Detection Value X: a detection value of a load in the X-axis direction applied to the operation shaft 142 detected by the strain sensors 132;

Detection Value Y: a detection value of a load in the Y-axis direction applied to the operation shaft 142 detected by the strain sensors 132;

Output Value Xvalue: an output value of a load in the X-axis direction applied to the operation shaft 142;

Output Value Yvalue: an output value of a load in the Y-axis direction applied to the operation shaft 142;

Variable_Off_count: a time period elapsed since the switch section (SW) was switched off;

Variable W: a variable for gradually changing the weighting of moving averages.

First, the control device 170 determines whether the switch section (SW) is in an on state (step S801).

In step S801, when it is determined that the switch section (SW) is in an on state (step S801: Yes), the control device 170 sets "ON" to the variable SW_Status (step S802).

Next, the control device 170 determines whether at least one of a detection value X and a detection value Y was suddenly changed immediately before the switch section (SW) was switched on (step S803). It should be noted that the expression "OR" in step S803 in FIG. 8 denotes logical disjunction. Here, if the difference between the detection value detected when the switch section (SW) was switched on and the detection value detected immediately before is greater than or equal to a threshold value, the control device 170 determines that "the detection values X and Y were suddenly changed immediately before the switch section (SW) was switched to on". For example, in a case where a detection value X and a detection value Y are detected every 0.1 second, if at least one of the difference between the detection value X detected when the switch section (SW) was switched on and the detection value X detected 0.1 second ago and the difference between the detection value Y detected when the switch section (SW) was switched to on and the detection value Y detected 0.1 second ago is greater than or equal to a predetermined threshold value, the control device 170 determines that "the detection values X and Y were suddenly changed immediately before the switch section (SW) was switched to on".

In step S803, when it is determined that "the detection values X and Y were suddenly changed immediately before the switch section (SW) was switched to on" (step S803: Yes), the control device 170 updates the output value Xvalue and the output value Yvalue to a detection value X detected before the sudden change and a detection value Y detected before the sudden change (step S804). Here, each time the control device 170 obtains a detection value detected before the sudden change one by one, the control device 170 calculates the difference between the detection value and the immediately preceding detection value, and when the difference is less than a predetermined threshold value, the immediately preceding detection value is determined to be a "detection value before the sudden change". Next, the control device 170 sets an initial value "0" to the variable W (step S806), sets an initial value "0" to the variable_Off_count (step S807), and outputs the output value Xvalue and the output value Yvalue (step S815). The control device 170 then ends the sequence of processing in FIG. 8.

In step S803, when it is determined that "the detection values X and Y were not suddenly changed immediately before the switch section (SW) was switched on" (step S803: No), the control device 170 updates the output value Xvalue and the output value Yvalue to the detection value X and the detection value Y (step S805). The control device 170 sets an initial value "0" to the variable W (step S806), sets an initial value "0" to the variable_Off_count (step S807), and outputs the output value Xvalue and the output value Yvalue (step S815). The control device 170 then ends the sequence of processing in FIG. 8.

In step S801, when it is determined that the switch section (SW) is in an off state (step S801: No), the control device 170 sets "OFF" to the variable SW_Status (Step S808). The control device 170 determines whether the variable Off_count is less than a predetermined threshold value TH (step S809).

In step S809, when it is determined that the variable Off_count is less than the predetermined threshold value TH (step S809: Yes), the control device 170 adds "1" to the variable Off_count (step S810). The control device 170 then outputs the output value Xvalue and the output value Yvalue without updating the output value Xvalue and the output value Yvalue (step S815). The control device 170 then ends the sequence of processing in FIG. 8. When the duration of the off state of the switch section (SW) is less than the threshold value TH, it can be considered that the force pressing the operation member 150 is weakened contrary to the operator's intention. Accordingly, the control device 170 continuously outputs a switch ON signal.

In step S809, when it is determined that the variable Off_count is greater than or equal to the predetermined threshold value TH (step S809: No), the control device 170 determines whether the variable W is less than "10" (step S811).

In step S811, when it is determined that the variable W is less than "10" (step S811: Yes), the control device 170 adds "1" to the variable W (step S812). The control device 170 then calculates an output value Xvalue and an output value Yvalue using a moving average calculation formula (step S813). The control device 170 outputs the output value Xvalue and the output value Yvalue calculated in step S813 (step S815). The control device 170 then ends the sequence of processing in FIG. 8. When the output values are suddenly changed from the values X and Y detected before the sudden change to latest values X and Y, the operator may feel uncomfortable. To solve the problem, the output values of the control device 170 are gradually brought closer to a latest value X and a latest value Y from the value X and the value Y detected before the sudden change respectively.

In step S811, when it is determined that the variable W is greater than or equal to "10" (step S811: No), the control device 170 updates the output value Xvalue and the output value Yvalue to a detection value X and a detection value Y respectively (step S814), and outputs the output value Xvalue and the output value Yvalue (step S815). The control device 170 then ends the sequence of processing in FIG. 8.

When the input device 100 is activated, the control device 170 initializes the output value Xvalue and the output value Yvalue to "0". While the input device 100 is being activated, the control device 170 repeatedly performs the sequence of processing in FIG. 8.

Example of Mean Average Calculation Formulas

Here, example mean average calculation formulas used in step S813 in the flowchart in FIG. 8 will be described.

First Example

For example, the control device 170 may calculate an output value Xvalue and an output value Yvalue using the following mathematical formula (1) and mathematical formula (2).

$$Xvalue = 0.7 \times Xvalue + 0.3 \times X \quad (1)$$

$$Yvalue = 0.7 \times Yvalue + 0.3 \times Y \quad (2)$$

These mathematical formula (1) and mathematical formula (2) calculate a new output value Xvalue and a new output value Yvalue using a detection value X, a detection value Y, an output value Xvalue, and an output value Yvalue by using a modified moving average, which is a type of exponential moving average. In the formulas, fixed values (for example, "0.3" and "0.7") are used for a first coefficient to multiply the detection value X and the detection value Y and for a second coefficient to multiply the output value Xvalue and the output value Yvalue respectively.

With the calculation formulas, after the switch section (SW) is switched off, the control device 170 can gradually return the output value Xvalue and the output value Yvalue, which have been kept constant since the switch section (SW) was switched on, to actual detection value X and detection value Y over multiple times (for example, 10 times in the flowchart in FIG. 8).

Second Example

For example, the control device 170 may calculate an output value Xvalue and an output value Yvalue using the following mathematical formula (3) and mathematical formula (4).

$$Xvalue = \left(1 - \frac{w}{10}\right) \times Xvalue + \frac{w}{10} \times X \quad (3)$$

$$Yvalue = \left(1 - \frac{w}{10}\right) \times Yvalue + \frac{w}{10} \times Y \quad (4)$$

These mathematical formula (3) and mathematical formula (4) calculate a new output value Xvalue and a new output value Yvalue using a detection value X, a detection value Y, an output value Xvalue, and an output value Yvalue by using a modified moving average, which is a type of exponential moving average. In these formulas, the first coefficient to multiply the detection value X and the detection value Y and the second coefficient to multiply the output value Xvalue and the output value Yvalue are gradually changed.

With the calculation formulas, after the switch section (SW) is switched off, the control device 170 can gradually return the output value Xvalue and the output value Yvalue, which have been kept constant since the switch section (SW) was switched on, to actual detection value X and detection value Y over multiple times (for example, 10 times in the flowchart in FIG. 8).

Third Example

For example, the control device 170 may calculate an output value Xvalue and an output value Yvalue using a simple moving average.

For example, in the above-described first example, moving averages are calculated multiple times by using the mathematical formula (1) and the mathematical formula (2). However, a moving average may be calculated only once by using the mathematical formula (1) and the mathematical formula (2) and an output value Xvalue and an output value Yvalue may be calculated by using a simple moving average using "0.5" for both of the two coefficients.

Fourth Example

For example, the control device 170 may store detection values X and detection values Y obtained in multiple times of detection in memory, and calculate an output value Xvalue and an output value Yvalue by using a simple moving average using the detection values X and the detection values Y obtained in multiple times of detection.

Figure 9:
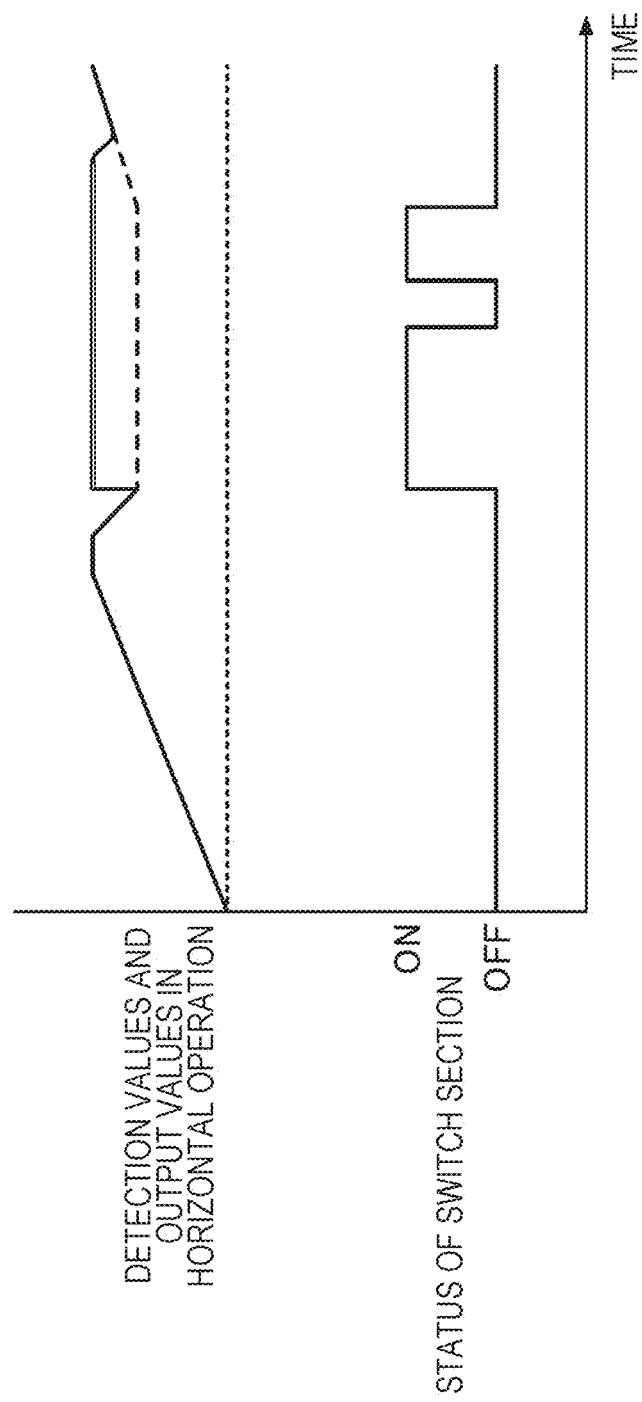
FIG. 9 is a timing diagram illustrating an example of time variations of detection values and output values in a horizontal operation in an input device according to an embodiment.

FIG. 9 is a timing diagram illustrating an example of time variations of detection values and output values in a horizontal operation in the input device 100 according to the embodiment.

In the upper section in FIG. 9, the dotted line denotes detection values (detection values in the horizontal direction applied to the operation shaft 142 detected by the strain sensors 132) in a horizontal operation. In the upper section in FIG. 9, the solid line denotes output values of detection values in the horizontal operation.

As illustrated in FIG. 9, in the input device 100, while a horizontal operation is being performed by using the operation member 150, if a pressing operation is performed by using the operation member 150, the detection values in the horizontal operation may become unstable due to the influence of the pressing operation.

However, in the input device 100, the control device 170 performs the sequence of processing in FIG. 8 such that the output values of the detection values in the horizontal operation are not updated while the pressing operation is being performed by using the operation member 150 as illustrated in FIG. 9, and thereby, the output values can be kept constant.

In the input device 100, the control device 170 performs the sequence of processing in FIG. 8 such that, when the detection values were suddenly changed immediately before the switch section (SW) was switched on as illustrated in FIG. 9, the output values of the detection values in the horizontal operation can be updated to a detection value X detected before the sudden change.

In the input device 100, the control device 170 performs the sequence of processing in FIG. 8 such that, as illustrated in FIG. 9, when the switch section (SW) is switched on and the output values of the detection values in the horizontal operation are kept constant and then the switch section (SW) is switched off, the output values of the detection values in the horizontal operation can be kept constant for a predetermined period of time.

In the input device 100, the control device 170 performs the sequence of processing in FIG. 8 such that, as illustrated in FIG. 9, after the switch section (SW) is switched off and a predetermined time period passes, the output values of the detection values in the horizontal operation are corrected multiple times, and thereby, the detection values can be gradually returned to actual detection values.

As described above, in the input device 100 according to the embodiment, the control device 170 performs the sequence of processing in FIG. 8 such that the output values of the detection values of the load are not updated while the pressing operation by using the operation member 150 is detected by the switch section.

By this operation, when a horizontal operation and a pressing operation by using the operation member 150 are simultaneously performed, the input device 100 according to the embodiment can keep the output values of the detection values in the horizontal operation constant even if the detection values (i.e. detection values of the load in the horizontal direction applied to the operation shaft 142) in the horizontal operation become unstable due to the influence of the pressing operation. Accordingly, the input device 100 according to the embodiment can prevent the output values of the detection values in the horizontal operation from becoming unstable contrary to the operator's intention.

In the input device 100 according to the embodiment, the control device 170 performs the sequence of processing in FIG. 8 such that the output values of the detection values of the load in the horizontal direction are not updated for a predetermined period of time after the switch section detects no pressing operation.

By this operation, while a pressing operation is being performed by the operator, even if the pressing operation is momentarily changed to an off state without the operator's intention, the input device 100 according to the embodiment can keep the output values of the detection values in the horizontal operation constant. Accordingly, the input device 100 according to the embodiment can prevent the output values of the detection values in the horizontal operation from becoming unstable contrary to the operator's intention.

In the input device 100 according to the embodiment, the control device 170 performs the series of processing in FIG. 8 such that after updating of the output values of the detection values of the load in the horizontal direction is stopped, for a predetermined period of time after the updating of the output values of the detection values of the load in the horizontal direction is resumed, the control device 170 outputs moving average values of the detection values of the load in the horizontal direction as output values of detection values of the load in the horizontal direction, and after the predetermined period of time has passed since the updating of the output values of the detection values of the load in the horizontal direction was resumed, the control device 170 outputs detection values of the load in the horizontal direction as output values of the detection values of the load in the horizontal direction.

By this operation, the input device 100 according to the embodiment can gradually return the output values of the detection values in the horizontal operation kept constant during the pressing operation to detection values of the load in the horizontal direction after the pressing operation, and thus the sudden change in the output values of the detection values in the horizontal operation can be reduced.

In the input device 100 according to the embodiment, the control device 170 performs the sequence of processing in FIG. 8 such that, with gradually changed first coefficients and second coefficients, moving average values are calculated multiple times by using values obtained by multiplying detection values of the load in the horizontal direction by a first coefficient and values obtained by multiplying output values of the detection values of the load in the horizontal direction by a second coefficient.

By this operation, the input device 100 according to the embodiment can further gradually return the output values of the detection values in the horizontal operation kept constant during the pressing operation to detection values of the load in the horizontal direction after the pressing operation, and thus the sudden change in the output values of the detection values in the horizontal operation can be further reduced.

In the input device 100 according to the embodiment, the control device 170 performs the sequence of processing in FIG. 8 such that when the switch member detects a pressing operation, if the detection value of the load in the horizontal direction is suddenly changed, the control device 170 uses a detection value of the load in the horizontal direction detected before the sudden change as an output value of the detection value of the load in the horizontal direction to be output while the output values of the detection values of the load in the horizontal direction are not updated.

By this operation, when a pressing operation is performed by the operator, even if the detection value of the load in the horizontal direction is suddenly changed due to the influence of the pressing operation without the operator's intention, the input device 100 according to the embodiment can constantly output a detection value in the horizontal operation detected before the sudden change during the pressing operation. Accordingly, the input device 100 according to the embodiment can prevent the output values of the detection values in the horizontal operation from becoming unstable contrary to the operator's intention.

Third Example of Output Control Processing by Control Device 170

Figure 10:
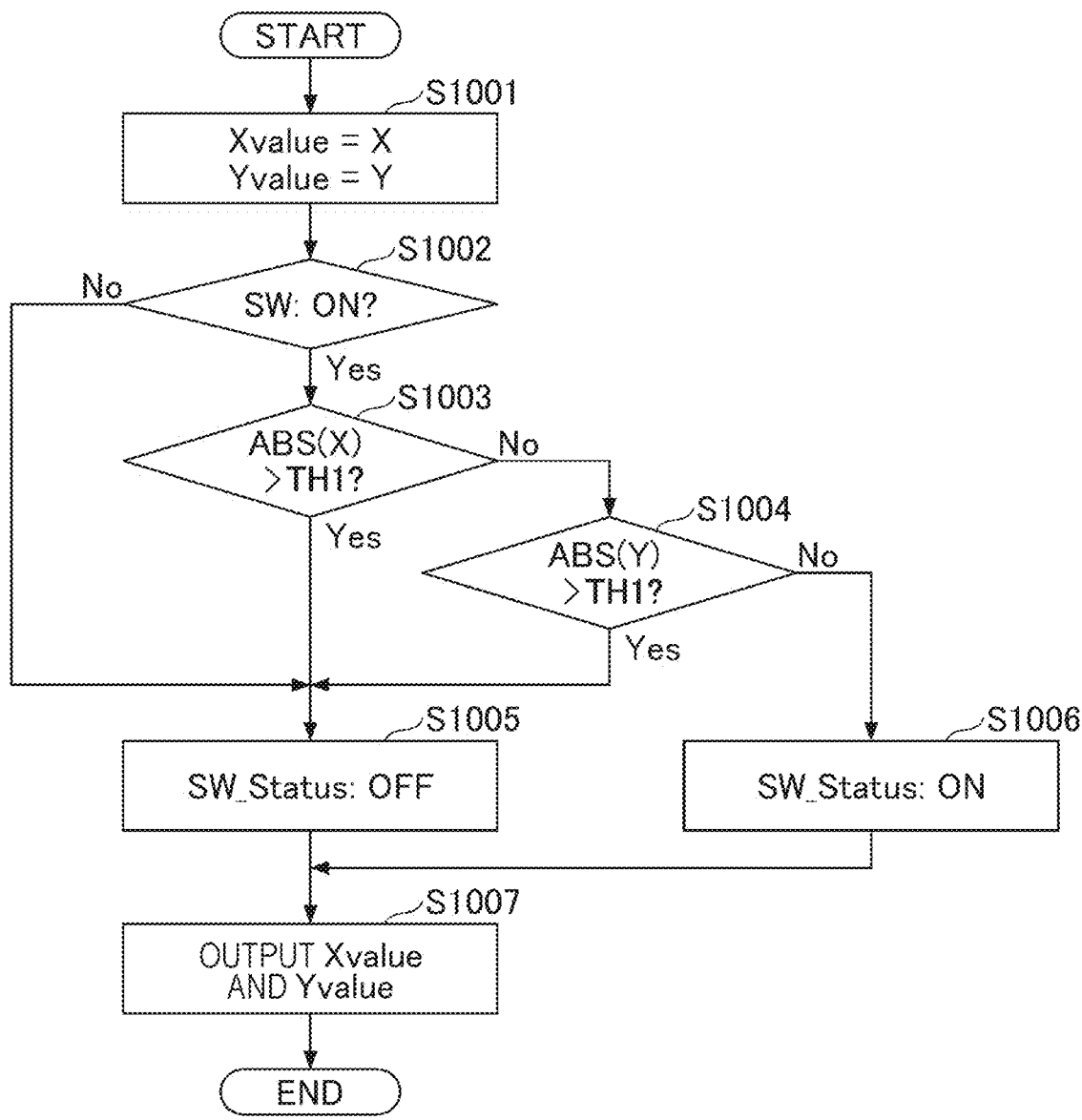
FIG. 10 is a flowchart illustrating a third example of output control processing to be performed by a control device in an input device according to an embodiment.

FIG. 10 is a flowchart illustrating a third example of output control processing to be performed by the control device 170 in the input device 100 according to the embodiment.

The definitions of values used in the output control processing in FIG. 10 are described as follows:

Variable SW_Status: a value that indicates a status of the switch section;

Detection value X: a detection value of a load in the X-axis direction applied to the operation shaft 142 detected by the strain sensors 132;

Detection value Y: a detection value of a load in the Y-axis direction applied to the operation shaft 142 detected by the strain sensors 132;

Output value Xvalue: an output value of a load in the X-axis direction applied to the operation shaft 142;

Output value Yvalue: an output value of a load in the Y-axis direction applied to the operation shaft 142;

First threshold value TH1: a threshold value for detection values X and Y for determining whether to disable the switch section.

First, the control device 170 updates an output value Xvalue and an output value Yvalue to a detection value X and a detection value Y (step S1001). Next, the control device 170 determines whether the switch section (SW) is in an on state (step S1002).

In step S1002, when it is determined that the switch section (SW) is in an off state (step S1002: No), the control device 170 sets "OFF" to the variable SW_Status (Step S1005) and outputs the output value Xvalue and the output value Yvalue (step S1007). The control device 170 then ends the sequence of processing in FIG. 10.

In step S1002, when it is determined that the switch section (SW) is in an on state (step S1002: Yes), the control device 170 determine whether the absolute value of the detection value X is greater than the first threshold value TH1 (step S1003).

In step S1003, when it is determined that the absolute value of the detection value X is greater than the first threshold value TH1 (step S1003: Yes), the control device 170 sets "OFF" to the variable SW_Status (Step S1005) and outputs the output value Xvalue and the output value Yvalue (step S1007). The control device 170 then ends the sequence of processing in FIG. 10.

In step S1003, when it is determined that the absolute value of the detection value X is less than or equal to the first threshold value TH1 (step S1003: No), the control device 170 determines whether the absolute value of the detection value Y is greater than the first threshold value TH1 (step S1004). In step S1004, when it is determined that the absolute value of the detection value Y is greater than the first threshold value TH1 (step S1004: Yes), the control device 170 sets "OFF" to the variable SW_Status (Step S1005) and outputs the output value Xvalue and the output value Yvalue (step S1007). The control device 170 then ends the sequence of processing in FIG. 10.

In step S1003, when it is determined that the absolute value of the detection value X is less than or equal to the first threshold value TH1 (step S1003: No) and in step S1004, determined that the absolute value of the detection value Y is less than or equal to the first threshold value TH1 (step S1004: No), the control device 170 sets "ON" to the variable SW_Status (Step S1006) and outputs the output value Xvalue and the output value Yvalue (step S1007). The control device 170 then ends the sequence of processing in FIG. 10.

In the input device 100 according to the embodiment, the control device 170 performs the sequence of processing in FIG. such that, when a detection value of a load in a horizontal direction is greater than the predetermined first threshold value TH1, the operation of the switch section is disabled.

By this processing, when an excessive load in a horizontal direction is applied to the operation shaft 142 by a horizontal operation, even if a pressing operation of pressing the switch section is performed contrary to the operator's intention, the input device 100 according to the embodiment can disable the pressing operation.

Fourth Example of Output Control Processing by Control Device 170

Figure 11:
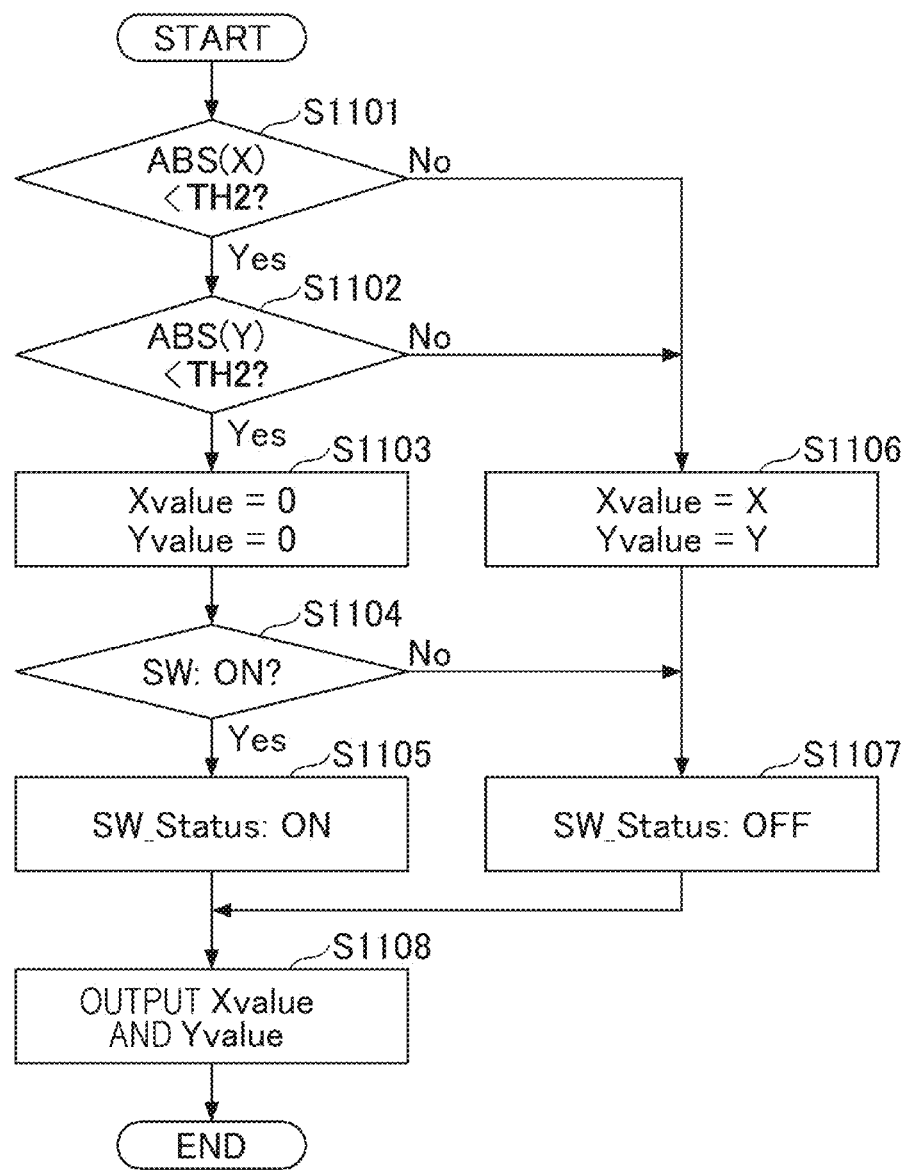
FIG. 11 is a flowchart illustrating a fourth example of output control processing to be performed by a control device in an input device according to an embodiment.

FIG. 11 is a flowchart illustrating a fourth example of output control processing to be performed by the control device 170 in the input device 100 according to the embodiment.

The definitions of values used in the output control processing in FIG. 11 are described as follows:

Variable SW_Status: a value that indicates a status of the switch section;
Detection value X: a detection value of a load in the X-axis direction applied to the operation shaft 142 detected by the strain sensors 132;
Detection value Y: a detection value of a load in the Y-axis direction applied to the operation shaft 142 detected by the strain sensors 132;
Output value Xvalue: an output value of a load in the X-axis direction applied to the operation shaft 142;
Output value Yvalue: an output value of a load in the Y-axis direction applied to the operation shaft 142;
Second threshold value TH2: a threshold value for detection values X and Y for determining whether to disable a detection value of a load in the horizontal direction, where the second threshold value TH2 is less than the first threshold value TH1.

First, the control device 170 determines whether the absolute value of a detection value X is less than the second threshold value TH2 (step S1101).

In step S1101, when it is determined that the absolute value of the detection value X is less than the second threshold value TH2 (step S1101: Yes), the control device 170 determines whether the absolute value of the detection value Y is less than the second threshold value TH2 (step S1102).

In step S1102, when it is determined that the absolute value of the detection value Y is less than the second threshold value TH2 (step S1102: Yes), the control device 170 sets "0" to each of the output value Xvalue and the output value Yvalue (step S1103). Next, the control device 170 determines whether the switch section (SW) is in an on state (step S1104).

In step S1104, when it is determined that the switch section (SW) is in an off state (step S1104: No), the control device 170 sets "OFF" to the variable SW_Status (Step S1107) and outputs the output value Xvalue and the output value Yvalue (step S1108). The control device 170 then ends the sequence of processing in FIG. 11.

In step S1104, when it is determined that the switch section (SW) is in an on state (step S1104: Yes), the control device 170 sets "ON" to the variable SW_Status (Step S1105) and outputs the output value Xvalue and the output value Yvalue (step S1108). The control device 170 then ends the sequence of processing in FIG. 11.

In step S1101, when it is determined that the absolute value of the detection value X is greater than or equal to the second threshold value TH2 (step S1101: No), or in step S1102, when it is determined that the absolute value of the detection value Y is greater than or equal to the second threshold value TH2 (step S1102: No), the control device 170 updates the output value Xvalue and the output value Yvalue to the detection value X and the detection value Y respectively (step S1106). The control device 170 then sets "OFF" to the variable SW_Status (Step S1107) and outputs the output value Xvalue and the output value Yvalue (step S1108). The control device 170 then ends the sequence of processing in FIG. 11.

In the input device 100 according to the embodiment, the control device 170 performs the sequence of processing in FIG. 11 such that, when a detection value of a load in a horizontal direction is less than the predetermined second threshold value TH2 that is less than the predetermined first threshold value TH1, the detection value of the load in the horizontal direction is disabled (set to "0").

By this processing, when a load in a horizontal direction is slight, the input device 100 according to the embodiment can regard the load as a load that is not intended by the operator and disable the detection value of the load in the horizontal direction.

Fifth Example of Output Control Processing by Control Device 170

Figure 12:
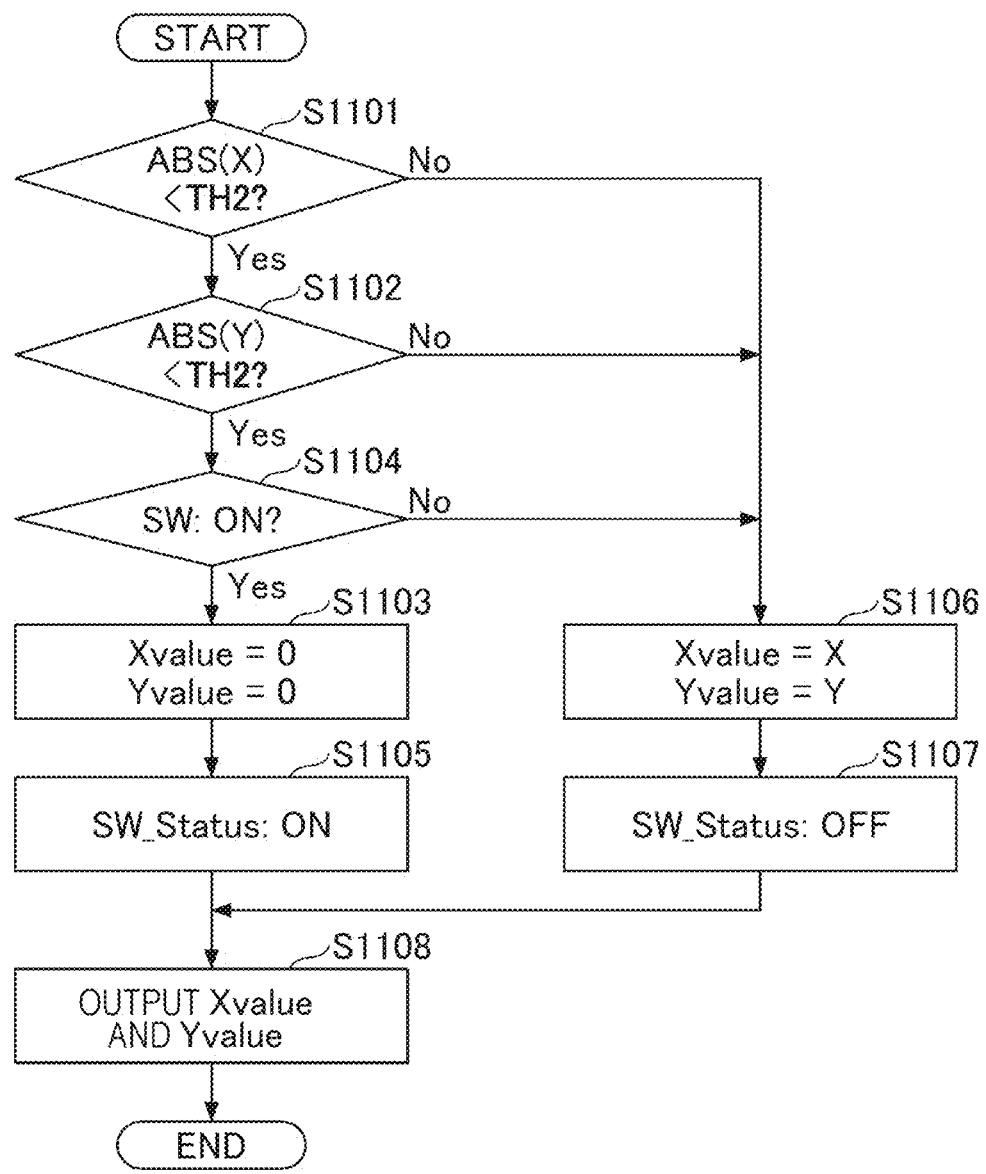
FIG. 12 is a flowchart illustrating a fifth example of output control processing to be performed by a control device in an input device according to an embodiment.

FIG. 12 is a flowchart illustrating a fifth example of output control processing to be performed by the control device 170 in the input device 100 according to the embodiment.

The flowchart in FIG. 12 differs from the flowchart in FIG. 11 in that the process in step S1104 is performed before the processes in step S1103 and step S1106, and other points are similar to those in the flowchart in FIG. 11.

In the flowchart in FIG. 12, in step S1104, when it is determined that the switch section (SW) is in an on state (step S1104: Yes), the control device 170 sets "0" to each of the output value Xvalue and the output value Yvalue (step S1103). In step S1104, when it is determined that the switch section (SW) is in an off state (step S1104: No), the control device 170 updates the output value Xvalue and the output value Yvalue to a detection value X and a detection value Y (step S1106). The control device 170 then sets "OFF" to the variable SW_Status (Step S1107) and outputs the output value Xvalue and the output value Yvalue (step S1108). The control device 170 then ends the sequence of processing in FIG. 11.

In the input device 100 according to the embodiment, the control deice 170 performs the sequence of processing in FIG. 12 such that, when a detection value of a load in the horizontal direction is less than the predetermined second threshold value TH2, which is less than the predetermined first threshold value TH1, and a pressing operation is detected by the switch section, the detection value of the load in the horizontal direction is disabled (set to "0").

By this processing, while the operator is performing a pressing operation, if a slight load in a horizontal direction is applied to the operation shaft 142 contrary to the operator's intention, the input device 100 according to the embodiment can disable the detection value of the load in the horizontal direction.

Modification of Output Control Processing by Control Device 170

In the input device 100 according to the embodiment, a load applied to the operation member 150 in a vertical direction (Z-axis direction) may be detected by the four strain sensors 132. The application of the load in the Z direction causes all strain sensors 132 to extend, increasing the resistance values. The control device 170 can detect the load in the Z direction based on the total of the resistance values of the strain sensors 132.

Figure 13:
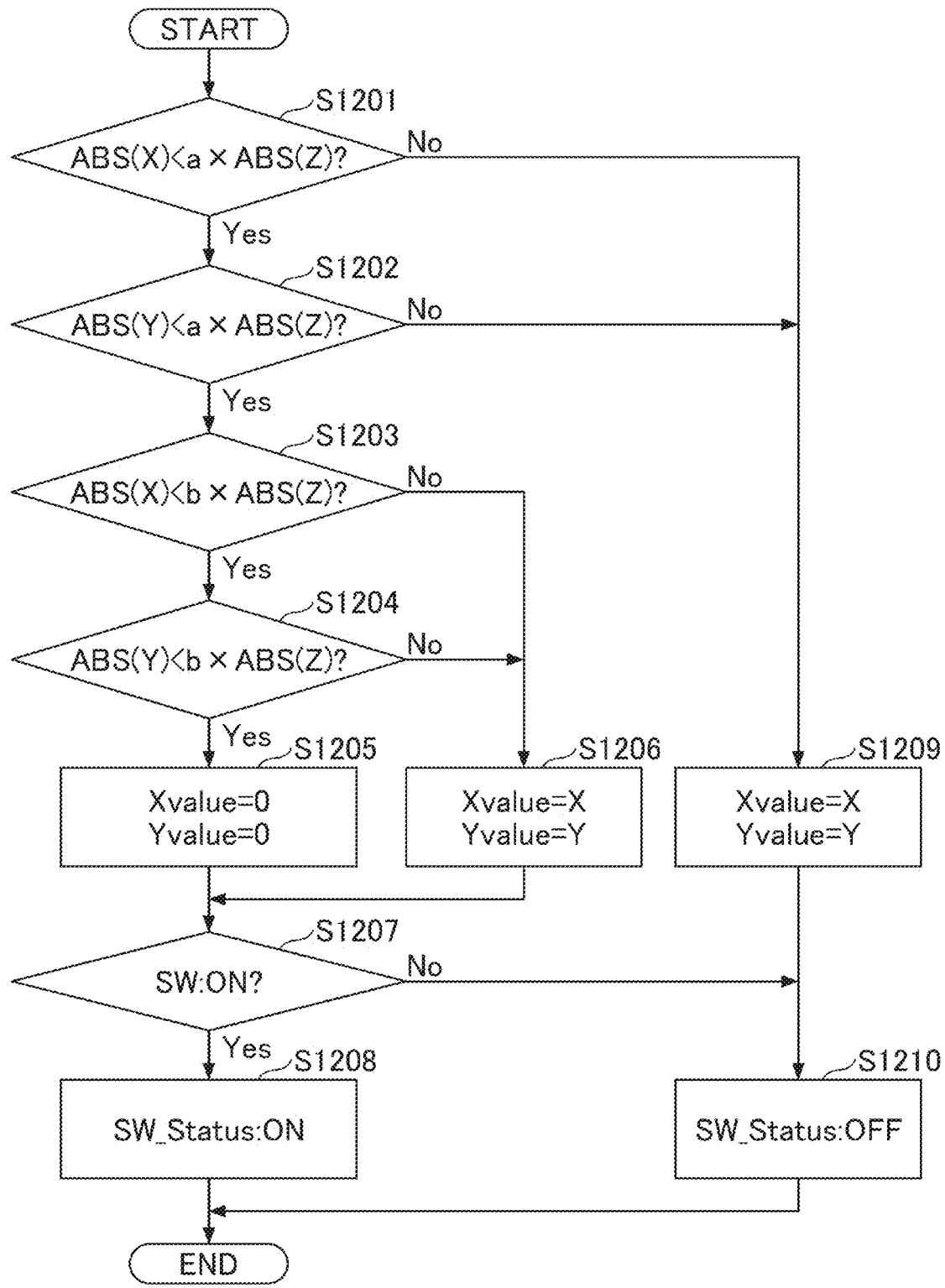
FIG. 13 is a flowchart illustrating a modification of output control processing to be performed by a control device in an input device according to an embodiment.

FIG. 13 is a flowchart illustrating a modification of the output control processing to be performed by the control device 170 in the input device 100 according to the embodiment.

The definitions of values used in the output control processing in FIG. 13 are described as follows:

Variable SW_Status: a value that indicates a status of the switch section;
Detection value X: a detection value of a load in the X-axis direction applied to the operation shaft 142 detected by the strain sensors 132;
Detection value Y: a detection value of a load in the Y-axis direction applied to the operation shaft 142 detected by the strain sensors 132;
Detection value Z: a detection value of a load in the Z-axis direction applied to the operation shaft 142 detected by the strain sensors 132;
Output value Xvalue: an output value of a load in the X-axis direction applied to the operation shaft 142;
Output value Yvalue: an output value of a load in the Y-axis direction applied to the operation shaft 142;
First constant a: a constant for multiplying a detection value Z of a load in a vertical direction where a is greater than or equal to 1;
Second constant b: a constant for multiplying a detection value Z of a load in a vertical direction where b is less than 1.

First, the control device 170 determines whether the absolute value of a detection value X is less than a value obtained by multiplying a detection value Z by the first constant a (step S1201).

In step S1201, when it is determined that the absolute value of a detection value X is less than a value obtained by multiplying a detection value Z by the first constant a (step S1201: Yes), the control device 170 determines whether the absolute value of a detection value Y is less than a value obtained by multiplying the detection value Z by the first constant a (step S1202).

In step S1202, when it is determined that the absolute value of a detection value Y is less than a value obtained by multiplying the detection value Z by the first constant a (step S1202: Yes), the control device 170 determines whether the absolute value of the detection value X is less than a value obtained by multiplying the detection value Z by the second constant b (step S1203).

In step S1203, when it is determined that the absolute value of the detection value X is less than a value obtained by multiplying the detection value Z by the second constant b (step S1203: Yes), the control device 170 determines whether the absolute value of the detection value Y is less than a value obtained by multiplying the detection value Z by the second constant b (step S1204).

In step S1204, when it is determined that the absolute value of the detection value Y is less than a value obtained by multiplying the detection value Z by the second constant b (step S1204: Yes), the control device 170 sets "0" to each of the output value Xvalue and the output value Yvalue (step S1205). After the process, the control device 170 performs a process in step S1207. More specifically, when both the detection value X and the detection value Y are less than the value obtained by multiplying the detection value Z by the second constant b, the control device 170 sets "0" to each of the output value Xvalue and the output value Yvalue.

In step S1201, when it is determined that the absolute value of a detection value X is greater than or equal to a value obtained by multiplying a detection value Z by the first constant a (step S1201: No), or in step S1202, when it is determined that the absolute value of a detection value Y is greater than or equal to a value obtained by multiplying the detection value Z by the first constant a (step S1202: No), the control device 170 updates the output value Xvalue and the output value Yvalue to the detection value X and the detection value Y (step S1209). The control device 170 then sets "OFF" to the variable SW_Status (Step S1210) and ends the sequence of processing in FIG. 13. In other words, when at least one of the detection value X and the detection value Y is greater than or equal to the value obtained by multiplying the detection value Z by the first constant a, the control device 170 determines that the state of the switch section is OFF.

In step S1203, when it is determined that the absolute value of the detection value X is greater than or equal to a value obtained by multiplying the detection value Z by the second constant b (step S1203: No), or in step S1204, when it is determined that the absolute value of the detection value Y is greater than or equal to a value obtained by multiplying the detection value Z by the second constant b (step S1204: No), the control device 170 updates the output value Xvalue and the output value Yvalue to the detection value X and the detection value Y (step S1206). After the process, the control device 170 performs the process in step S1207.

In step S1207, the control device 170 determines whether the switch section (SW) is in an on state (step S1207).

In step S1207, when it is determined that the switch section (SW) is in an off state (step S1207: No), the control device 170 sets "OFF" to the variable SW_Status (Step S1210), and ends the sequence of processing in FIG. 13.

In step S1207, when it is determined that the switch section (SW) is in an on state (step S1207: Yes), the control device 170 sets "ON" to the variable SW_Status (step S1208), and ends the sequence of processing FIG. 13.

As described above, when a detection value of a load in a horizontal direction is greater than or equal to a value obtained by multiplying the detection value of the load in the vertical direction detected by the four strain sensors 132 by the first constant a, the control device 170 can disable the operation of the switch section.

By this processing, while the operator is performing a horizontal operation, if a load in the vertical direction is applied to the operation member 150 contrary to the operator's intention, the input device 100 according to the embodiment can disable the detection value of the load in the vertical direction (i.e. disable the unintended pressing operation).

In addition, when a detection value of a load in a horizontal direction is less than a value obtained by multiplying a detection value of a load in the vertical direction detected by the four strain sensors 132 by the second constant b, the control device 170 can disable the detection value of the load in the horizontal direction.

By this processing, while the operator is performing a pressing operation, if a slight load in a horizontal direction is applied to the operation shaft 142 contrary to the operator's intention, the input device 100 according to the embodiment can disable the detection value of the load in the horizontal direction (i.e. disable the unintended horizontal operation).

Sixth Example of Output Control Processing by Control Device 170

Figure 14:
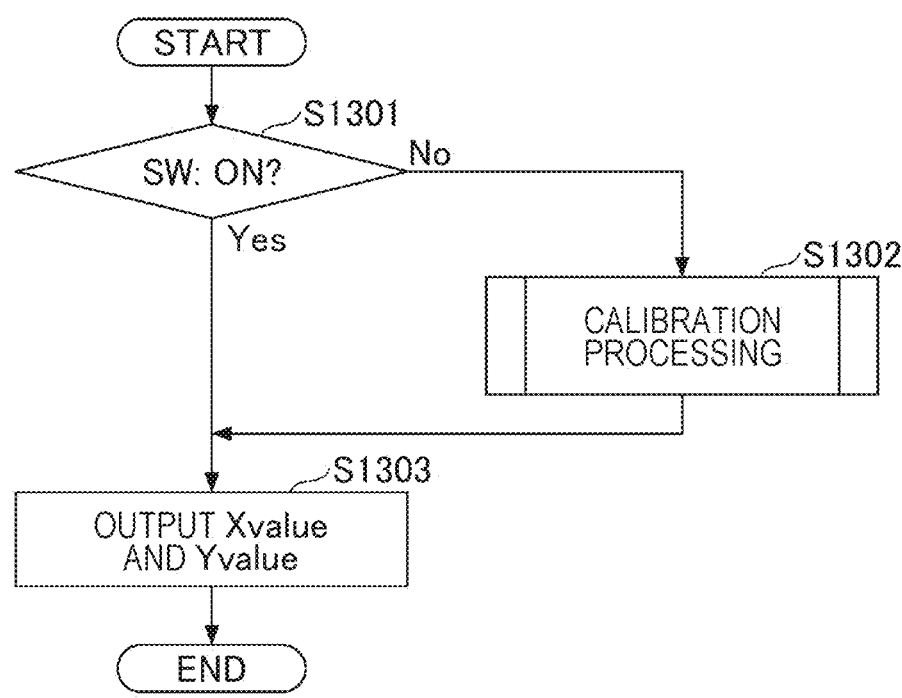
FIG. 14 is a flowchart illustrating a sixth example of output control processing to be performed by a control device in an input device according to an embodiment.

FIG. 14 is a flowchart illustrating a sixth example of output control processing to be performed by the control device 170 in the input device 100 according to the embodiment.

The definitions of values used in the output control processing in FIG. 14 are described as follows:
  Output value Xvalue: an output value of a load in the X-axis direction applied to the operation shaft 142;
  Output value Yvalue: an output value of a load in the Y-axis direction applied to the operation shaft 142.

First, the control device 170 determines whether the switch section (SW) is in an on state (step S1301).

In step S1301, when it is determined that the switch section (SW) is in an on state (step S1301: Yes), the control device 170 outputs an output value Xvalue and an output value Yvalue (step S1303). The control device 170 then ends the sequence of processing in FIG. 14.

In step S1301, when it is determined that the switch section (SW) is in an off state (step S1301: No), the control device 170 performs calibration processing in FIG. 16 (step S1302). The control device 170 then outputs the output value Xvalue and the output value Yvalue (step S1303). The control device 170 then ends the sequence of processing in FIG. 14.

Seventh Example of Output Control Processing by Control Device 170

Figure 15:
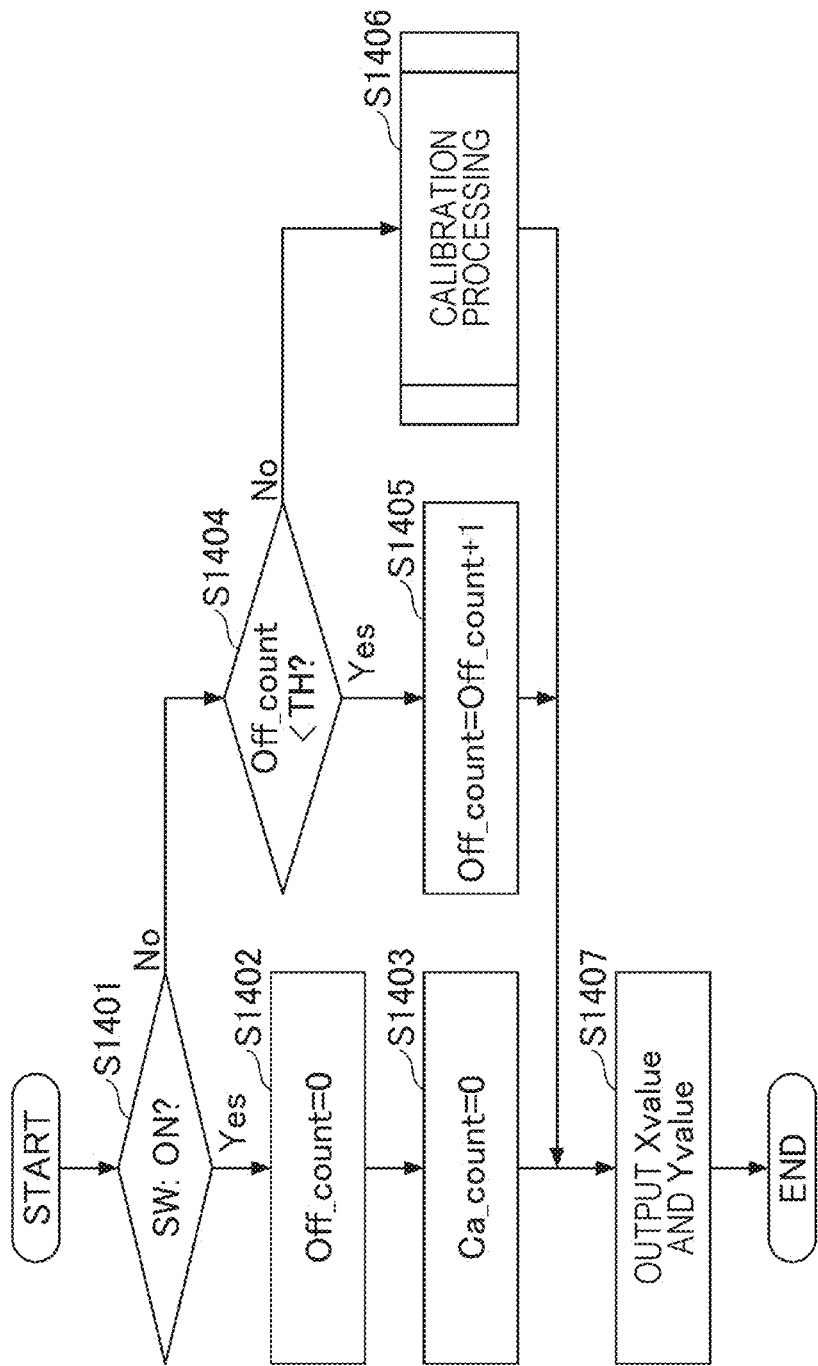
FIG. 15 is a flowchart illustrating a seventh example of output control processing to be performed by a control device in an input device according to an embodiment.

FIG. 15 is a flowchart illustrating a seventh example of output control processing to be performed by the control device 170 in the input device 100 according to the embodiment.

The definitions of values used in the output control processing in FIG. 15 are described as follows:
  Output value Xvalue: an output value of a load in the X-axis direction applied to the operation shaft 142;
  Output value Yvalue: an output value of a load in the Y-axis direction applied to the operation shaft 142;
  Variable_Off_count: a time period elapsed since the switch section (SW) was switched off;
  Variable_Ca_count: a time period elapsed since it was determined that no load is applied to the operation shaft 142.

First, the control device 170 determines whether the switch section (SW) is in an on state (step S1401).

In step S1401, when it is determined that the switch section (SW) is in an on state (step S1401: Yes), the control device 170 sets an initial value "0" to the variable Off_count (step S1402), and sets the initial value "0" to the variable Ca_count (step S1403). The control device 170 then outputs the output value Xvalue and the output value Yvalue (step S1407). The control device 170 then ends the sequence of processing in FIG. 15.

In step S1401, when it is determined that the switch section (SW) is in an off state (step S1401: No), the control device 170 determines whether the variable Off_count is less than a predetermined threshold value TH (step S1404).

In step S1404, when it is determined that the variable Off_count is less than the predetermined threshold value TH (step S1404: Yes), the control device 170 adds "1" to the variable Off_count (step S1405). The control device 170 then outputs the output value Xvalue and the output value Yvalue (step S1407). The control device 170 then ends the sequence of processing in FIG. 15.

In step S1404, when it is determined that the variable Off_count is greater than or equal to the predetermined threshold value TH (step S1404: No), the control device 170 performs the calibration processing in FIG. 15 (step S1406). The control device 170 then outputs the output value Xvalue and the output value Yvalue (step S1407). The control device 170 then ends the sequence of processing in FIG. 15.

Eighth Example of Output Control Processing by Control Device 170

Figure 16:
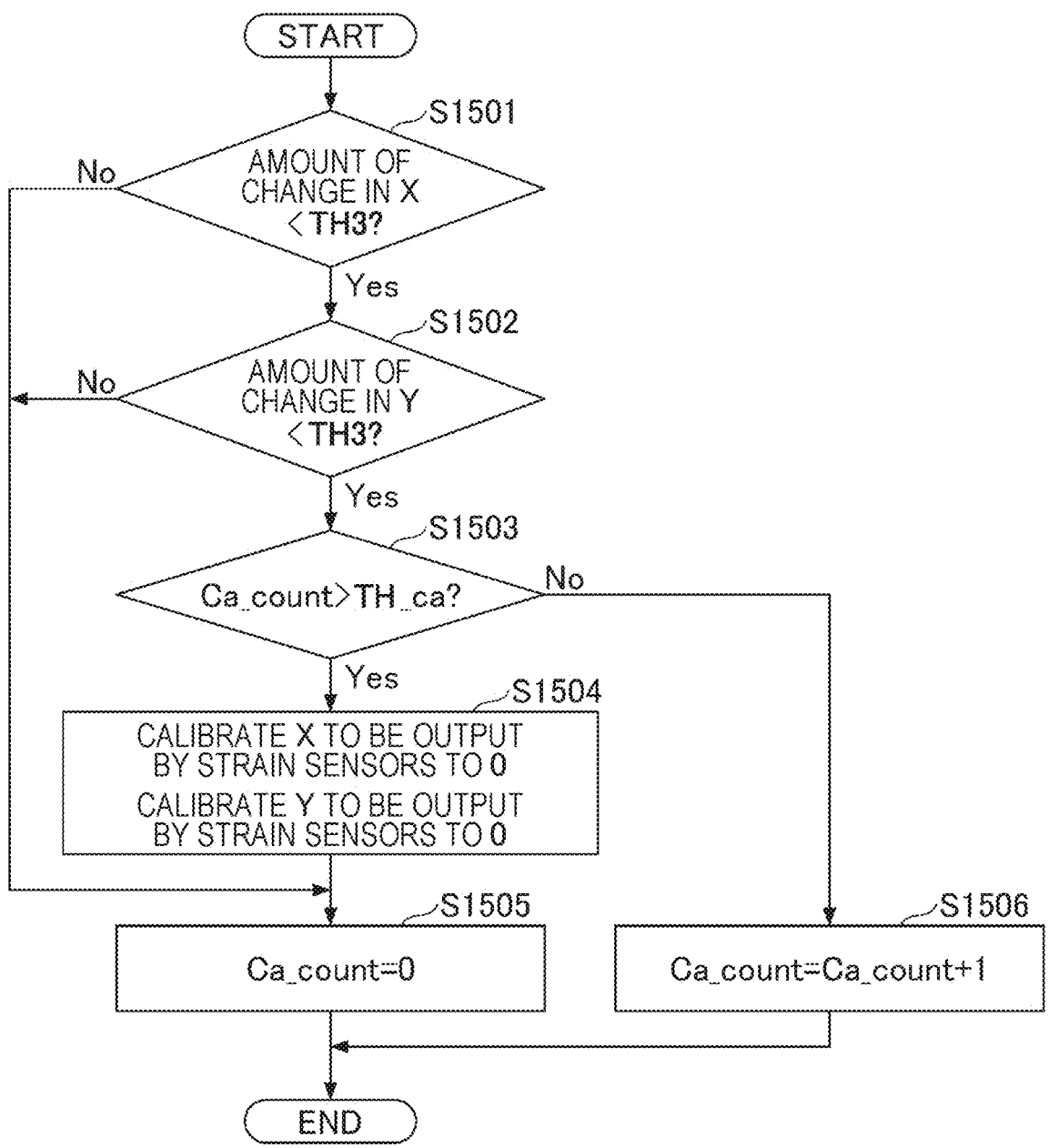
FIG. 16 is a flowchart illustrating calibration processing to be performed by a control device in an input device according to an embodiment.

FIG. 16 is a flowchart illustrating calibration processing to be performed by the control device 170 in the input device 100 according to the embodiment.

The definitions of values used in the calibration processing in FIG. 16 are described as follows:
  Detection value X: a detection value of a load in the X-axis direction applied to the operation shaft 142 detected by the strain sensors 132; Detection value Y: a detection value of a load in the Y-axis direction applied to the operation shaft 142 detected by the strain sensors 132;
  Third threshold value TH3: a threshold value for an amount of change in detection values X and Y for determining whether detection values X and Y change;
  Variable_Ca_count: a time period elapsed since it was determined that detection values X and Y did not change;
  Threshold value TH_Ca: a threshold value for a variable Ca_count for determining that detection values X and Y have not changed for a certain period of time.

First, the control device 170 determines whether the amount of change in a detection value X is less than the third threshold value TH3 (step S1501).

In step S1501, when it is determined that the amount of change in the detection value X is greater than or equal to the predetermined third threshold value TH3 (step S1501: No), the control device 170 sets "0" to the variable Ca_count (Step S1505) and ends the sequence of processing in FIG. 16.

In step S1501, when it is determined that the amount of change in the detection value X is less than the predetermined third threshold value TH3 (step S1501: Yes), the control device 170 determines whether the amount of change in the detection value Y is less than the predetermined third threshold value TH3 (step S1502).

In step S1502, when it is determined that the amount of change in the detection value Y is greater than or equal to the predetermined third threshold value TH3 (step S1502: No), the control device 170 sets "0" to the variable Ca_count (Step S1505), and ends the sequence of processing in FIG. 16.

In step S1502, when it is determined that the amount of change in the detection value Y is less than the predetermined third threshold value TH3 (step S1502: Yes), the control device 170 determines whether the variable Ca_count is greater than or equal to the predetermined threshold value TH_Ca (step S1503).

In step S1503, when it is determined that the variable Ca_count is greater than the predetermined threshold value TH_Ca (step S1503: Yes), the control device 170 calibrates the detection value X to be output by the strain sensors 132 to "0" and calibrates the detection value Y to be output by the strain sensors 132 to "0" (step S1504). The control device 170 sets "0" to the variable Ca_count (Step S1505) and ends the sequence of processing in FIG. 16.

In step S1503, when it is determined that the variable Ca_count is less than or equal to the predetermined threshold value TH_Ca (step S1503: No), the control device 170 adds "1" to the variable Ca_count (Step S1506), and ends the sequence of processing in FIG. 16.

In the input device 100 according to the embodiment, the control device 170 performs the sequence of processing in FIG. 14 or FIG. 15 and also performs the sequence of processing in FIG. 16. Accordingly, when a pressing operation is not detected and a condition continues for a predetermined period of time in which an amount of change in a load in a horizontal direction is less than the predetermined third threshold value (i.e. a state in which no horizontal operation is performed), the control device 170 calibrates the output value of the load in the horizontal direction to be output by the strain sensors 132 to 0.

By this processing, the input device 100 according to the embodiment can calibrate an output value of a load in a horizontal direction to be output by the strain sensors 132 to 0 at appropriate timing both a pressing operation and a horizontal direction are not performed, increasing the accuracy of the output value of the load in the horizontal direction to be output by the strain sensors 132.

Modification of Structure of Input Device 100

Figure 17:
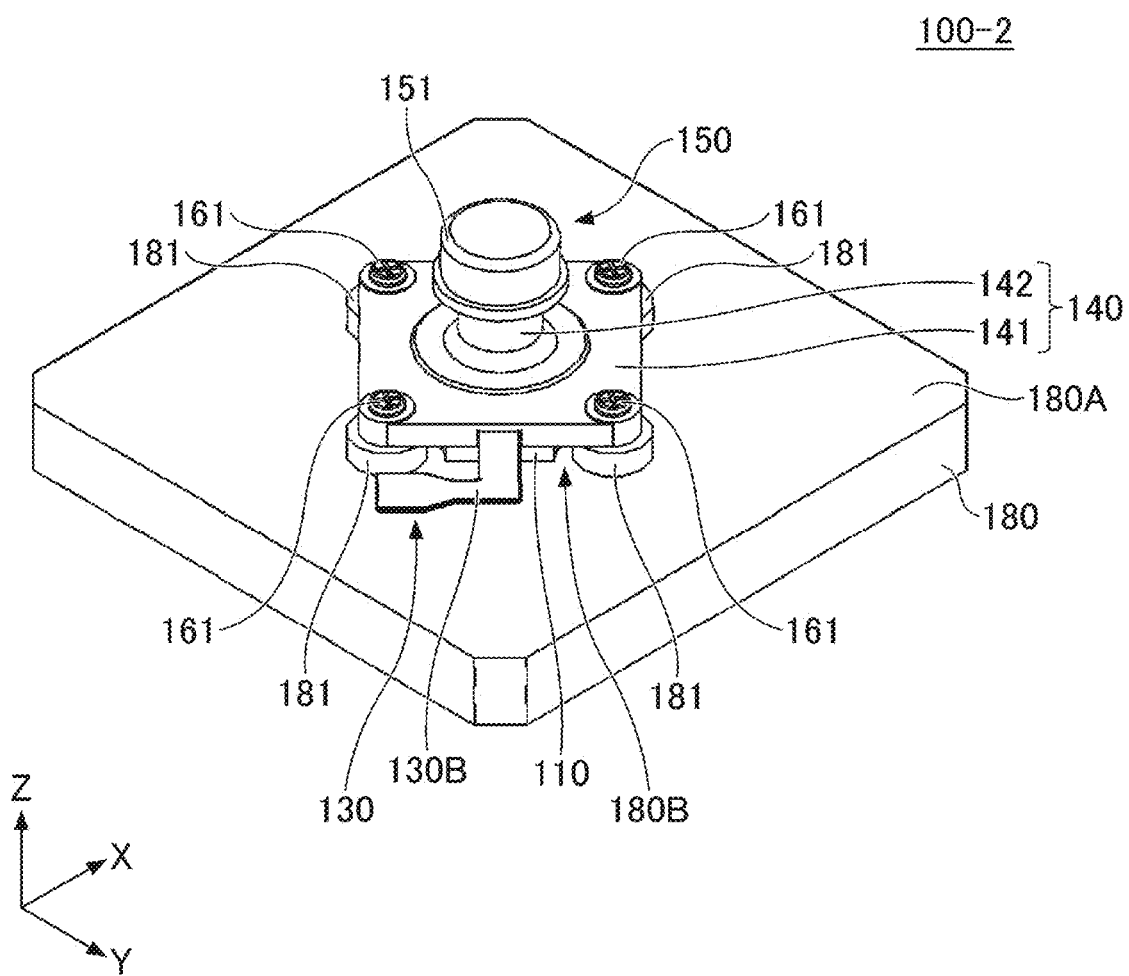
FIG. 17 is an external perspective view of an input device according to a modification of an embodiment.
Figure 18:
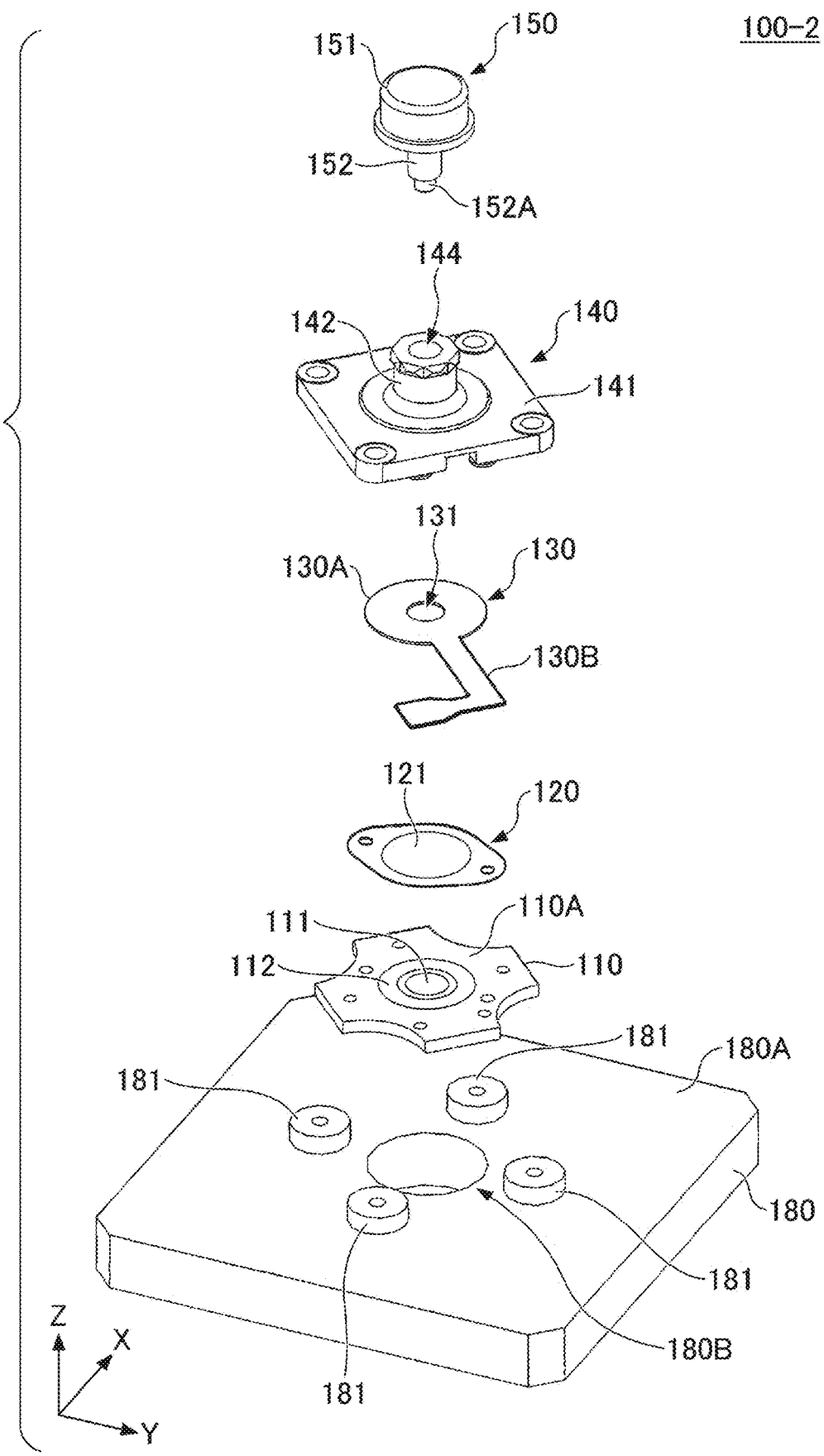
FIG. 18 is an exploded perspective view of an input device according to a modification of an embodiment viewed from above.
Figure 19:
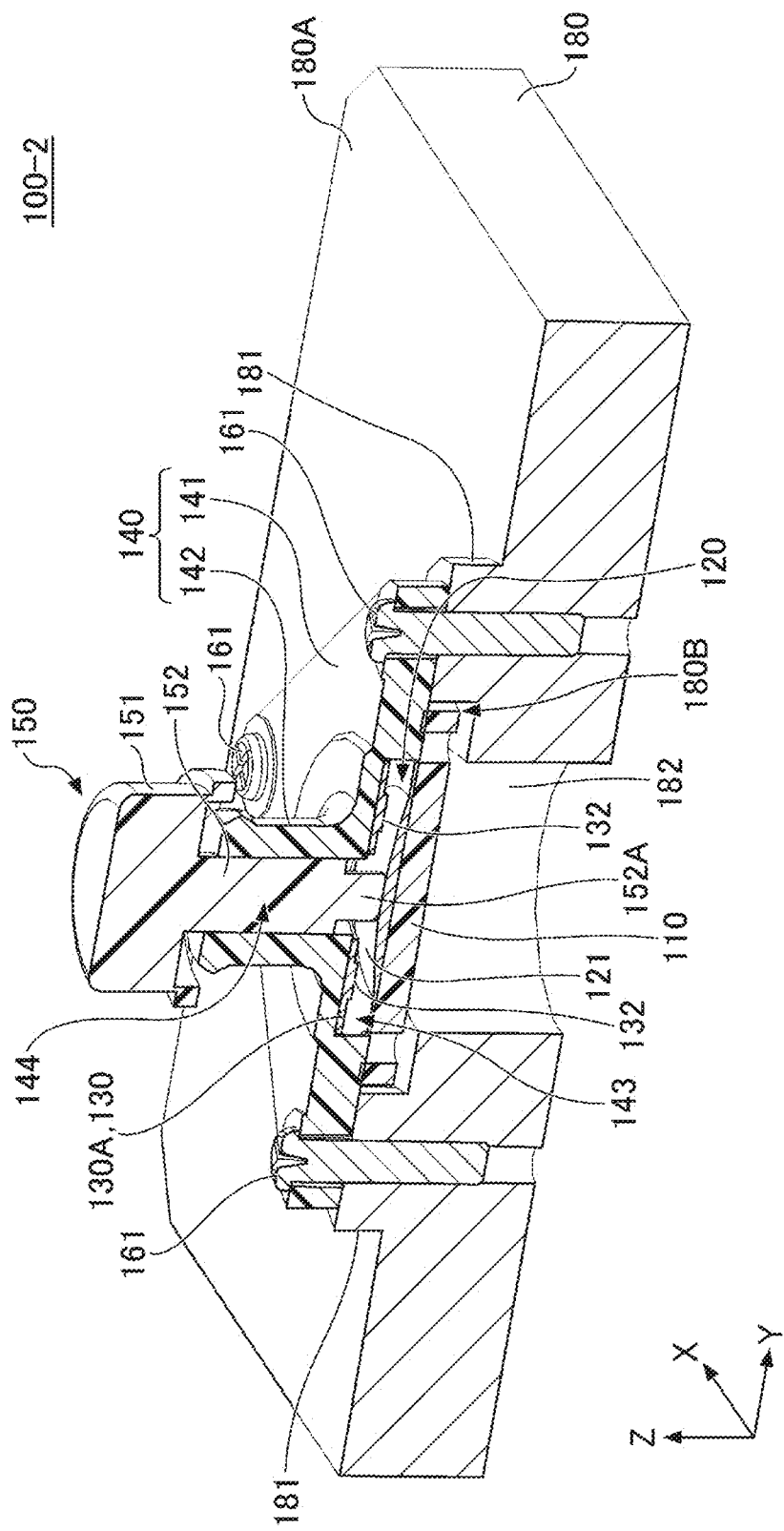
FIG. 19 is a perspective cross-sectional view of an input device according to a modification of an embodiment.

FIG. 17 is an external perspective view of an input device 100-2 according to a modification of the embodiment. FIG. 18 is an exploded perspective view of the input device 100-2 according to the modification of the embodiment viewed from above. FIG. 19 is a perspective cross-sectional view of the input device 100-2 according to the modification of the embodiment.

The input device 100-2 illustrated in FIG. 17 to FIG. 19 further includes a flat plate-like fixing plate 180 provided under the board 110. The input device 100-2 differs from the input device 100 in that the base 141 of the strain generation body 140 is screwed on four bases 181 that protrude from an upper surface 180A of the fixing plate 180 with four screws 161 passing through the base 141 in the up-down direction (Z-axis direction). The four bases 181 each have a columnar shape of a predetermined height.

The board 110 in the input device 100-2 illustrated in FIG. 17 to FIG. 19 is disposed in a space 180B surrounded by the four bases 181 and screwed on a lower surface of the base 141 of the strain generation body 140. The board 110 is away from the upper surface 180A of the fixing plate 180. The board 110 is not directly fixed to the fixing plate 180. A hole 182 is provided in a central portion of the fixing plate 180. The hole 182 of the fixing plate 180 produces a reduced click sound in response to a pressing operation performed by using the operation member 150. To reduce a click sound, a sound-absorbing material may be provided in the hole 182.

The input device 100-2 according to the modification of the embodiment is similar to the input device 100 except the above-described differences. The input device 100-2 according to the modification can detect a load in a vertical direction. The input device 100-2 operates similarly to the input device 100 in detecting a load in a horizontal direction and provides effects similarly to the input device 100.

It should be noted that inequality signs ($<$, $>$) in each embodiment may be replaced by inequality signs ($\leq$, $\geq$) that include equal signs.

While the embodiment of the present invention has been described in detail, it is to be understood that the invention is not limited to this exemplary embodiment, various modifications or changes may be made within the scope of the invention.

What is claimed is:

1. An input device comprising:
   a strain generation body having an operation shaft;
   a load sensor configured to detect a load in a horizontal direction applied to the operation shaft;
   an operation member disposed in an upper portion of the operation shaft, the operation member being configured to be operated in a pressing operation;
   a switch section configured to detect one of an ON state and an OFF state based on the pressing operation performed by using the operation member; and
   a controller configured to output a detection value of the load in the horizontal direction detected by the load sensor and a detection value corresponding to one of the ON state and the OFF state detected by the switch section to an external device,
   wherein the controller is configured not to update the detection value of the load in the horizontal direction while the ON state is detected by the switch section, and
   the controller is configured to output the detection value of the load in the horizontal direction at a time in which the switch section previously detects the OFF state while the ON state is detected by the switch section.

2. The input device according to claim 1, wherein the controller is configured not to update the detection value of the load in the horizontal direction for a predetermined period of time after the switch section no longer detects the ON state.

3. The input device according to claim 1, wherein, when the switch section detects the ON state, if the detection value of the load in the horizontal direction is suddenly changed, the controller is further configured to use a detection value of the load in the horizontal direction detected before the sudden change as the detection value of the load in the horizontal direction to be output while the detection value of the load in the horizontal direction is not updated.

4. The input device according to claim 1, wherein
when the detection value of the load in the horizontal direction is greater than a predetermined first threshold value, the controller is further configured to disable the ON state.

5. The input device according to claim 4, wherein,
when the detection value of the load in the horizontal direction is less than a predetermined second threshold value that is less than the predetermined first threshold value, the controller is further configured to disable the detection value of the load in the horizontal direction.

6. The input device according to claim 4, wherein,
when the detection value of the load in the horizontal direction is less than a predetermined second threshold value that is less than the predetermined first threshold value and the ON state is detected by the switch section, the controller is further configured to disable the detection value of the load in the horizontal direction.

7. The input device according to claim 1, wherein
when the ON state is not detected and a condition continues for a predetermined period of time in which an amount of change in the load in the horizontal direction is less than a predetermined third threshold value, the controller is further configured to calibrate the load in the horizontal direction to be output by the load sensor to 0.

8. The input device according to claim 1, wherein the operation member includes a shaft portion passing through the strain generation body,
the load sensor is disposed on a flexible substrate fixed to a lower surface of the strain generation body, and when a horizontal operation is performed by using the operation member, the load sensor detects deformation of the strain generation body to detect the load in the horizontal direction applied to the strain generation body, and
the switch section is disposed under the strain generation body, and when the pressing operation is performed by using the operation member, the switch section is pressed by the shaft portion of the operation member to detect the ON state by the operation member.

9. The input device according to claim 8, wherein
the switch section includes:
a movable contact having an elastically deformable domed dome portion; and
a stationary contact disposed under the movable contact, and
the dome portion is pressed by the operation member to be reversed to come into contact with the stationary contact to detect the ON state performed by using the operation member.

10. The input device according to claim 9, wherein the movable contact is a metal plate having the dome portion, and provides tactile response when the dome portion is reversed.

11. An input device comprising:
a strain generation body having an operation shaft;
a load sensor configured to detect a load in a horizontal direction applied to the operation shaft;
an operation member disposed in an upper portion of the operation shaft, the operation member being configured to be operated in a pressing operation;
a switch section configured to detect the pressing operation performed by using the operation member; and
a controller configured to output a detection value of the load in the horizontal direction detected by the load sensor and a detection value of the pressing operation detected by the switch section to an external device,
wherein the controller is configured not to update the output value of the detection value of the load in the horizontal direction while the pressing operation is being detected by the switch section, and
wherein, after updating of the output values of the detection values of the load in the horizontal direction is stopped, for a predetermined period of time after the updating of the output values of the detection values of the load in the horizontal direction is resumed, the controller outputs moving average values of the detection values of the load in the horizontal direction as output values of detection values of the load in the horizontal direction, and after the predetermined period of time the updating of the output values of the detection values of the load in the horizontal direction is resumed, the controller outputs detection values of the load in the horizontal direction as output values of the detection values of the load in the horizontal direction.

12. The input device according to claim 11, wherein the controller is configured to gradually change a first coefficient and a second coefficient and calculate the moving average values multiple times by using values obtained by multiplying detection values of the load in the horizontal direction by the first coefficients and values obtained by multiplying output values of the detection values of the load in the horizontal direction by the second coefficients.

13. An input device comprising:
a strain generation body having an operation shaft;
a load sensor configured to detect a load in a horizontal direction applied to the operation shaft;
an operation member disposed in an upper portion of the operation shaft, the operation member being configured to be operated in a pressing operation;
a switch section configured to detect the pressing operation performed by using the operation member; and
a controller configured to output a detection value of the load in the horizontal direction detected by the load sensor and a detection value of the pressing operation detected by the switch section to an external device,
wherein the switch section detects a load in a vertical direction applied to the operation member, and
when the detection value of the load in the horizontal direction is greater than a value obtained by multiplying the detection value of the load in the vertical direction by a first constant, the controller disables the pressing operation, where the first constant is greater than 1.

14. The input device according to claim 13, wherein when the detection value of the load in the horizontal direction is less than a value obtained by multiplying the detection value of the load in the vertical direction by a second constant, the controller disables the detection value of the load in the horizontal direction, where the second constant is less than 1.

* * * * *